(12) United States Patent
Battlogg

(10) Patent No.: US 12,529,401 B2
(45) Date of Patent: *Jan. 20, 2026

(54) MAGNETORHEOLOGICAL BRAKING DEVICE

(71) Applicant: INVENTUS Engineering GmbH, St. Anton i.M. (AT)

(72) Inventor: Stefan Battlogg, St. Anton i.M. (AT)

(73) Assignee: INVENTUS Engineering GmbH, St. Anton, i.M. (AT)

( * ) Notice: Subject to any disclaimer, the term of this patent is extended or adjusted under 35 U.S.C. 154(b) by 385 days.

This patent is subject to a terminal disclaimer.

(21) Appl. No.: 18/248,557

(22) PCT Filed: Oct. 12, 2021

(86) PCT No.: PCT/EP2021/078154
§ 371 (c)(1),
(2) Date: Apr. 11, 2023

(87) PCT Pub. No.: WO2022/079013
PCT Pub. Date: Apr. 21, 2022

(65) Prior Publication Data
US 2023/0375052 A1    Nov. 23, 2023

(30) Foreign Application Priority Data
Oct. 13, 2020    (DE) .................... 10 2020 126 912.9

(51) Int. Cl.
*F16F 9/53*        (2006.01)
*F16D 57/00*       (2006.01)
(Continued)

(52) U.S. Cl.
CPC ............. *F16D 57/002* (2013.01); *G05G 5/03* (2013.01); *F16D 2121/20* (2013.01);
(Continued)

(58) Field of Classification Search
CPC ............. F16D 57/002; F16D 2121/20; F16D 2127/001; F16D 2129/08;
(Continued)

(56) References Cited

U.S. PATENT DOCUMENTS 6,481,546 B2 * 11/2002 Oliver .................... F16F 9/537
188/269
7,335,233 B2 *  2/2008 Hsu ........................ H01F 1/447
252/62.52
(Continued)

FOREIGN PATENT DOCUMENTS

CN    102349218 A    2/2012
CN    103807329 A    5/2014
(Continued)

*Primary Examiner* — Christopher P Schwartz
(74) *Attorney, Agent, or Firm* — Laurence A. Greenberg; Werner H. Stemer; Ralph E. Locher

(57) ABSTRACT

A magnetorheological braking device has two braking components that are continuously rotatable relative to one another. A first braking component extends in the axial direction and the second braking component includes a hollow casing extending around the first braking component. A peripheral gap is filled with a magnetorheological medium. The first braking component has an electric coil and a magnetically conductive core which extends in the axial direction. A star contour with magnetic field concentrators on the core and/or on the shell part project into the gap, which results in a peripheral gap region with a variable gap height. The electric coil is wound around the core such that a magnetic field runs through the core and the magnetic field concentrators and through the gap into a wall of the casing. A star contour is formed by a stack of star plates.

31 Claims, 10 Drawing Sheets

(51) Int. Cl.
*G05G 5/03* (2008.04)
*F16D 121/20* (2012.01)
*F16D 127/00* (2012.01)
*F16D 129/08* (2012.01)

(52) U.S. Cl.
CPC .... *F16D 2127/001* (2013.01); *F16D 2129/08* (2013.01); *F16D 2200/0034* (2013.01); *F16D 2250/0023* (2013.01); *G05G 2505/00* (2013.01)

(58) Field of Classification Search
CPC .... F16D 2200/0034; F16D 2250/0023; G05G 5/03; G05G 2505/00
USPC ............... 267/140.14, 140.15; 188/267.1
See application file for complete search history.

(56) References Cited

U.S. PATENT DOCUMENTS

| | | | |
|---|---|---|---|
| 8,193,670 | B2 | 6/2012 | Liao et al. |
| 10,054,186 | B2 | 8/2018 | Battlogg |
| 10,386,929 | B2 | 8/2019 | Eck et al. |
| 10,976,827 | B2 | 4/2021 | Battlogg |
| 11,266,867 | B2 | 3/2022 | Battlogg |
| 11,300,990 | B2 | 4/2022 | Battlogg |
| 11,360,503 | B2 * | 6/2022 | Battlogg ................ G06F 3/016 |
| 11,815,142 | B2 * | 11/2023 | Wellborn ............... F16D 57/002 |
| 12,292,757 | B2 * | 5/2025 | Battlogg ................ F16F 9/535 |
| 2002/0057152 | A1 | 5/2002 | Elfrich et al. |
| 2011/0128135 | A1 | 6/2011 | Periquet et al. |
| 2011/0181405 | A1 | 7/2011 | Periquet et al. |
| 2012/0085613 | A1 | 4/2012 | Böse et al. |
| 2012/0211315 | A1 | 8/2012 | Shiao et al. |
| 2015/0136548 | A1 | 5/2015 | Shimura et al. |
| 2016/0378131 | A1 | 12/2016 | Battlogg |
| 2018/0073590 | A1 * | 3/2018 | Battlogg ................ G05G 5/04 |
| 2018/0320750 | A1 | 11/2018 | Takahashi et al. |
| 2020/0355229 | A1 | 11/2020 | Battlogg |
| 2024/0392847 | A1 * | 11/2024 | Battlogg ............... B60T 13/748 |

FOREIGN PATENT DOCUMENTS

| | | |
|---|---|---|
| CN | 104963986 A | 10/2015 |
| CN | 107111368 A | 8/2017 |
| CN | 107710106 A | 2/2018 |
| CN | 107735748 A | 2/2018 |
| CN | 108930731 A1 | 12/2018 |
| CN | 109073030 A | 12/2018 |
| DE | 112004002908 A5 | 8/2007 |
| DE | 102010055833 A1 | 3/2012 |
| DE | 102012017423 A1 | 3/2014 |
| DE | 102015104927 A1 | 10/2016 |
| DE | 102018100390 A1 | 7/2019 |
| DE | 102020106328 B3 | 5/2021 |
| DE | 102020127055 A1 | 6/2021 |
| EP | 1168622 A2 | 1/2002 |
| WO | 2012034697 A1 | 3/2012 |
| WO | 2017001696 A1 | 1/2017 |

* cited by examiner

MAGNETORHEOLOGICAL BRAKING DEVICE

FIELD AND BACKGROUND OF THE INVENTION

The invention relates to a magnetorheological braking device having a stationary mount and having at least two brake components and/or damper components. The magnetorheological braking device according to the invention can be used for braking mutual relative movements in many technical fields. The magnetorheological braking device according to the invention can also be used as a haptic operating device and be used, for example, for operating technical devices in vehicles, e.g. as a rotary actuator; a rotate/push actuator; for the infotainment system, the air conditioning system (temperature, fan stage, distribution . . . ), as a transmission selector, for the navigation system, in the cruise control system, in the vehicle distance control system, as a seat adjuster, in the steering system or in the steering wheel, in the suspension adjustment system, in the driving mode adjustment system, for adjusting the windshield wipers, for adjusting windows or sunroofs, in the parking assistance system or for setting the (partially) autonomous driving mode, or as a replacement of a steering wheel. The use in motor vehicles, aerospace vehicles and aircraft, ships, boats, agricultural engineering (tractors, combine harvesters, harvesters, other cultivation machines for agriculture), construction machinery, and machines for material handling (forklift trucks . . . ) or in medical or industrial systems is possible. The invention can also be used for the operation, or as an input device, of/for washing machines, kitchen/domestic appliances and devices, radios, still and movie cameras, HiFi and TV systems, smart devices, smart domestic devices, laptops, personal computers, smart watches, in a crown gear of wristwatches or as a computer mouse or as a rotating wheel in a computer mouse or in controllers, game consoles, gaming equipment, as a rotary button in a keyboard, or other devices.

Magnetorheological fluids have minute ferromagnetic particles such as, for example, carbonyl iron powder, distributed in an oil, for example. Approximately round or spherical particles having a production-related diameter of 1 to 10 μm are used in magnetorheological fluids, wherein the size and shape of the particles is not uniform. When such a magnetorheological fluid is impinged by a magnetic field, the carbonyl iron particles of the magnetorheological fluid form a chain along the magnetic field lines so that the rheological properties of the magnetorheological fluid (MRF) are significantly influenced as a function of the shape and intensity of the magnetic field (transmissible shear stresses).

WO 2012/034697 A1 discloses a magnetorheological transmission apparatus which has two couplable components, the intensity of the coupling of the latter being able to be influenced. A duct having a magnetorheological medium is provided for influencing the coupling intensity. The magnetorheological medium in the duct is influenced by a magnetic field. Rotating members on which acute regions that contain the magnetorheological medium are provided in the duct. The duct, or at least a part thereof, is able to be impinged with the magnetic field of a magnetic field generator device so as to selectively (magnetically) interlink the particles, and to wedge them to the rotating member, or release said particles. This magnetorheological transmission apparatus can also be used on a rotary button for operating technical equipment. Such a magnetorheological transmission apparatus functions and permits the transmission of comparatively great forces or torques while at the same time having a relatively small construction mode and construction volume.

WO 2012/034697 A1 also discloses a rotary button or operating button in which the actual button is attached so as to be rotatable about a shaft. The braking moment can be controlled by way of the magnetic field generated by an electric coil. Should a higher generatable braking moment be desired, cylindrical rollers instead of spherical rotating members can also be used so that the magnetic field acts on a longer distance, or larger area (there being a concentration of the magnetic field and formation of a wedge across a larger area). It has been demonstrated, in particular in the case of rotary or operating buttons having a relatively small diameter, that an increase in the length of the rolling members does not necessarily lead to an increase in the maximum generatable braking moment. It has been demonstrated that the cause thereof lies in that the magnetic field is closed by the central shaft, or has to pass through the latter.

The small diameter of the shaft restricts the generatable braking moment, because the magnetic field required for the braking action is rapidly saturated in the (shaft) material. The material passed through by the magnetic field no longer permits any higher magnetic flux, which is why a more intense magnetic field cannot make its way to the rollers either. The smallest cross section passed through by the magnetic field in the entire magnetic circuit defines the maximum possible magnetic flux and thus the maximum braking moment in the brake apparatus. The use of longer rollers as rotating members in this instance can even have a negative effect on the generatable braking moment because the magnetic field is distributed across the longer roller area. A lower field strength bears on (low magnetic field concentration). As the achievable braking effect is not a linear function of the magnetic field but this disproportionally increases in the case of more intense magnetic fields, the achievable braking effect accordingly drops disproportionally in the case of weaker magnetic fields.

SUMMARY OF THE INVENTION

It is therefore the object of the present invention to provide a magnetorheological braking device, which permits a high braking moment (torque), or a higher braking moment (torque) than is the case in the prior art in particular also in the case of small or even very small diameters.

This object is achieved by a magnetorheological braking device as claimed. Preferred refinements of the invention are the subject matter of the dependent claims. Further advantages and features of the magnetorheological braking device are derived from the general description and the description of the exemplary embodiments.

A magnetorheological braking device according to the invention has a stationary mount and a brake housing and at least two brake components. One of the two brake components is connected in a rotationally fixed manner to the mount, and the two brake components are continuously rotatable relative to one another. A first brake component extends in an axial direction and comprises a core of a magnetically conductive material that extends in the axial direction. The second brake component comprises a casing part which is rotatable about the first brake component and is configured to be hollow. An encircling gap which is at least partially and in particular completely filled with a magnetorheological medium is configured between the first brake component and the second brake component. The magnetorheological medium here wets the brake components. Received in the brake housing is (at least) one electric coil. Disposed or received between the casing part and the core is at least one star contour having magnetic field concentrators that are configured thereon and protrude (in particular radially and/or also axially) into the gap so that an encircling gap space having a variable gap height (along the circumferential angle) results in the region of the star contour. The star contour comprises at least one stack of (small) star sheets. A width of a star sheet is narrow in comparison with a width or total width of the stack.

The first brake component defines an axial direction. However, the first brake component, at least locally, can also be configured so as to be angled in relation to the axial direction. The wording pertaining to the core of the first brake component extending in the axial direction in the context of the present invention is understood to mean that the core extends at least also substantially in the axial direction. The core can have a profile which has a slight angle in relation to the axial direction. For example, the core can also be aligned at an angle of 2.5° or 5° or 10° or 15° in relation to the axial direction. The winding of the electric coil can be aligned radially about the core, or can also be aligned in the axial direction about the core (likewise not exactly). The electric coil can also be wound about the core at an angle of 5° or 10° or 15° or the like in relation to the axial or radial direction. In the case of the electric coil being wound axially about the core, it is preferable that an angle between the alignment of the core and the axial direction, and an angle of the winding of the electric coil in relation to the axial direction, are less than 20° and in particular less than 10°.

The magnetorheological braking device according to the invention has many advantages. One significant advantage magnetorheological brake device according to the invention lies in that, as a result of the star contour or a contour similar to that of a star, a high braking moment (high shear stresses) is able to be generated by the magnetic field concentrators.

A particular advantage is derived in that the magnetic field concentrators are fixedly connected to the core, or to the casing part, and are in particular integrally connected thereto. A particularly simple construction which can be produced in a cost-effective manner is made possible as a result by lower assembly outlay. It has been surprisingly demonstrated that the magnetic field concentrators do not have to be configured as self-rotating or as rotatable rolling members but that stationary magnetic field concentrators in a reliable and reproducible manner make available a high increase in terms of the generatable braking moment. The magnetic field concentrators can either be separately manufactured and be fixedly connected to the star contour or directly to the core or the casing part and screwed, riveted, soldered/brazed, welded or optionally also adhesively bonded or press-fitted thereto, for example. Surprisingly, it also possible for the magnetic field concentrators to be attached to the casing part. Overall, a high braking moment is achieved with a small (and even smaller) installation space. As a result, the braking moment can overall be increased, or be maintained in the case of a smaller installation space. This opens up new possibilities, because a higher braking moment than hitherto can be generated with a considerably smaller installation space.

A magnetorheological braking device according to the invention is provided for the use in different devices. The magnetorheological braking device can be used in a haptic operating device or be designed as such. The magnetorheological braking device can also be used in a device component.

A star contour in the context of the present invention is also understood to be a contour similar to that of a star. A star contour in the context of the present invention has radially projecting contour elements as magnetic field concentrators. In particular, a local radius on a contour element is larger than at a position adjacent thereto in the circumferential direction. The maximum local radius there is preferably at least 0.1% and in particular at least 0.25% (and preferably more) larger than a minimum local radius adjacent thereto in the circumferential direction. A plurality of contour elements are preferably configured across the circumference.

The core consists of a magnetically (highly) conductive material. The core can be made in particular of sintered material (metal). The core can thus be manufactured more easily in any desired shape. The first brake component preferably comprises the core and in particular an axle or a shaft, which consists in particular at least partially or completely of a magnetically non-conductive material. Preferably, the axle (the shaft) and the core are detachably connected to one another.

The star contour consists at least in part, or completely, of a magnetically (highly) conductive material.

The electric coil is preferably wound about at least one portion of the core so that a magnetic field of the electric coil runs through the core and the magnetic field concentrators, and through the gap (extending axially and/or radially) into a wall of the casing part.

The magnetic field, or the magnetic field lines, preferably runs/run transversely through the first or inner brake component. An increase in the length of the first brake component in this instance, at the same diameter, increases the potential magnetic flux and thus the braking moment. The potential core diameter which in most cases cannot be larger for reasons of construction, in this instance does not restrict the magnetic flux.

In the magnetorheological braking device the magnetic field concentrators form transmission components. The magnetic field concentrators, or the transmission components, are at least partially, and in particular substantially completely, or completely, surrounded by a magnetorheological medium. Overall, a magnetorheological fluid is preferably used as the magnetorheological medium.

A plurality of magnetic field concentrators (as transmission components) are preferably disposed so as to be distributed across the circumference of the gap. The magnetic field concentrators are not rotatable about themselves, but rotate conjointly with the brake component to which said magnetic field concentrators are fastened. As a result, a relative movement in the gap occurs during the rotation.

It is possible that even further transmission components are comprised in addition to the magnetic field concentrators or instead of individual segments of the star contour, said further transmission components being configured as rolling members, for example. The term "rolling member" in the context of the present invention is understood to be a rotating member which is suitable to roll on the first or the second brake component in the gap.

In preferred embodiments and further developments of the magnetorheological brake device according to the invention, at least one disk contour is formed between the casing part and the core, wherein a gap section is formed between the disk contour and the casing part. A gap height in the gap section is thereby less variable than the gap height in the gap section of the star contour.

In simple and particularly preferred embodiments, the gap has specially designed braking areas. In the braking areas, the gap is locally considerably narrower than in other places. A main braking area is formed by the gap section at the star contour. A different (e.g. second) brake area can be provided by the gap section on the disk contour.

Preferably, a minimum gap height at a gap section on the star contour is less than 0.25 mm or 0.20 mm or 0.15 mm and preferably less than 0.1 mm and may, for example, be 0.05 mm+1-25%. Preferably, a gap height at a gap section on a disk contour is less than 0.15 mm and preferably less than 0.1 mm and may, for example, be 0.05 mm+/−25%.

Preferably, the gap section has a substantially constant (and small) gap height over the circumference. Particularly preferably, the disk contour has a cylindrical outer contour. The gap height may be, for example, at the cylindrical outer contour between 0.03 mm and 0.1 mm, preferably about 0.05 mm. This also enables the casing part to be guided through the disk contour.

In preferred embodiments, the disk contour may have an outwardly protruding outer contour on one axial side. The outer contour can be conical, cone-shaped, bulbous or rounded. In particular, the outwardly protruding outer contour is rotationally symmetrical. The outer contour protruding outwards can also be cone-shaped. Due to the outwardly protruding outer contour, a reservoir for magnetorheological medium or fluid can be provided, which can be needed in the area of the gap section (further braking area) during braking to provide magnetic particles.

Preferably, the gap section has a smaller gap height than a minimum gap height or at least medium gap height of the gap section. Due to a small gap height in the gap section, a strong magnetic field can be transmitted, since the magnetic losses are small. Preferably, the star contour guides the casing part in the gap section. Particularly preferably, the disk contour guides the casing part in the gap section and serves as a bearing point for the casing part. This allows a particularly cost-effective design. Due to the narrow tolerances possible there, a magnetorheological brake device and a haptic operating device with a magnetorheological brake device can be provided in a small installation space, which meets high and highest quality requirements and can be produced easily and cost-effectively. Preferably, a rolling element section is formed on the core, on which rolling elements are arranged between the core and the casing part. Preferably, the rolling elements can move completely around the core. An outer surface of the core is preferably cylindrical in the rolling element section. The rolling element section forms another braking area. The rolling elements consist at least partially and at least partially or completely of a magnetically conductive material. In particular, all rolling elements are made of a magnetically conductive material.

A hybrid solution with a braking area on a star contour in a gap section and with another braking area on a rolling element section offers many advantages.

In the rolling element section, rolling elements are arranged around the core on the circumference of the core, in particular when (adjacent to) the rolling element section an electric coil is wound around the core. The star contour is then preferably arranged on one axial side of the electric coil, and the rolling element section with the rolling elements is arranged on the other side. The magnetic field of the electric coil then runs in the core and in the casing part in the axial direction. In the gap section, the field lines of the magnetic field then enter radially from the core through the star contour into the casing part or vice versa. Likewise, the field lines of the magnetic field in the rolling element section form approximately radially through the rolling elements into the casing part or vice versa.

The rolling element section allows the generation of high braking torques, especially at low speeds of the casing part. The braking area with the star contour allows a high static torque and higher torques at higher speeds.

A radial free space for a rolling element between the casing part and the core in the rolling element section is preferably greater than a minimum gap height in the gap section at the star contour.

The radial clearance for a rolling element in the rolling element section is preferably more than twice or at least three times as large or greater than the minimum gap height in the gap section of the star contour. For an effective wedge effect, a gap height is useful in the rolling element section, which is greater than the minimum gap height in the gap section of the star contour.

The rolling elements can be guided via magnetically non-conductive guide elements.

In all embodiments, it is preferred that the star contour comprises at least one stack of (thin) star plates. A star plate may, for example, be between 0.5 mm and 5 mm or 10 mm thick. In advantageous simple embodiments, the star plate has a thickness between about 1 mm and about 3 mm.

Preferably, at least one stack comprises directly adjacent star plates.

It is also possible for a disk contour to be used. A disk contour is formed in particular by a stack package of (thin) disk plates. A disk contour is particularly round.

A stack for the star contour and/or a disk contour may also comprise star plates and disk plates. These can also form separate sub-stacks or, for example, be arranged alternately or mixed. Among other things, disk plates, round sheets and other contour plates can be used.

In particular, a batch package may comprise a plurality of stamped parts or consist of stamped parts. Star plates and/or disk plates and/or other contour plates are in particular stamped parts.

In one preferred design embodiment, the magnetorheological braking device comprises a stationary mounting and at least two brake components, wherein one of the two brake components is connected in a rotationally fixed manner to the mount, and wherein the two brake components are continuously rotatable relative to one another, wherein one first brake component extends in the axial direction, and wherein the second brake component comprises a casing part which extends about the first brake component and is configured to be hollow and, at least in portions, cylindrical on the inside, wherein an encircling gap which is at least partially filled with a magnetorheological medium is configured between the first and the second brake component. The first brake component here comprises at least one electric coil and a core which is made from a magnetically conductive material and extends in the axial direction, wherein the core comprises a main body and outwardly projecting core contours (forming magnetic field concentrators) such that an encircling gap having a gap height which is variable (across the circumferential angle) results, and wherein the electric coil is wound about at least one portion of the core, or surrounds the core, such that a magnetic field of the electric coil runs through the core and through at least one core contour which projects outward on said core (configured as a magnetic field concentrator), and through the (axially or radially) outwardly adjoining gap section into a wall of the casing part.

In one preferred refinement of the invention, at least one contour element of a star contour (a magnetic field concentrator) has a cross-sectional area that tapers toward the distal end.

At least one magnetic field concentrator is preferably configured so as to be rounded on the distal end.

It is preferable for the core to comprise a plurality of arms and/or for the casing part to comprise a plurality of arms as magnetic field concentrators, said arms projecting radially and/or axially. Arms project radially outward from the core and/or axially laterally from the core. Arms preferably project radially inward and/or also axially laterally from the casing part.

In all design embodiments it is preferable for at least one arm to be surrounded by an electric coil. A plurality of arms are particularly preferably in each case surrounded by one electric coil.

A radial length of a (radially projecting) arm is preferably smaller than a length of the arm in the axial direction.

At least one electric coil is preferably wound about the axle and in the core generates substantially a magnetic field substantially in the axial direction (radial COI).

The electric coil is preferably received radially (in an encircling manner) between the core and the casing part.

The electric coil, or at least one electric coil, is in particular fastened to the inside of the casing part. In this instance, the electric coil is radially spaced apart from the core on the first brake component. It is also possible and preferable for at least one electric coil to be wound about the core. An electric coil can be wound radially about the core. It is also possible for the electric coil to be wound axially about the core. In this instance, an axis of symmetry of the electric coil extends transversely to the longitudinal extent of the first brake component.

In preferred design embodiments, at least two star contours are received in the brake housing. The star contours can be configured identically and in particular also differently.

Preferably, two star contours are received axially spaced apart from one another. It is also possible for three, four or more star contours to be (in each case) received axially spaced apart from one another. Each of these star contours can be configured identically, or else have a shape that differs from that of the other star contours.

It is preferable for two star contours to be in each case configured identically in pairs.

At least one star contour is in particular configured as a separate (and preferably hollow) annular flange having radially projecting magnetic field concentrators.

The magnetic field concentrators can be configured so as to project radially outward. In this instance, the annular flange is preferably fixedly (and preferably releasably) connected to the core.

The magnetic field concentrators can be configured so as to project obliquely outward. In this instance, the annular flange is preferably fixedly (and preferably releasably) connected to the core.

The magnetic field concentrators can be configured so as to project laterally (axially). In this instance, the annular flange is preferably fixedly (and preferably releasably) connected to the core.

The magnetic field concentrators can also be configured so as to project radially inward. In this instance, the annular flange is preferably fixedly (and preferably releasably) connected to the casing part.

The magnetic field concentrators can also be configured so as to project obliquely inward. In this instance, the annular flange is preferably fixedly (and preferably releasably) connected to the casing part.

The magnetic field concentrators can also be configured so as to project laterally (axially) inward. In this instance, the annular flange is preferably fixedly (and preferably releasably) connected to the casing part.

At least two star contours preferably have a dissimilar external contour. The external contour can differ radially on the inside and/or radially on the outside and/or on at least one axial side, for example.

At least one star contour preferably has radially outwardly projecting magnetic field concentrators and is fastened in a magnetically conducting manner to the core, and in particular on the core. For example, the star contour can be secured on the core by a screw connection.

At least one star contour preferably has radially inwardly projecting magnetic field concentrators and is fastened in a magnetically conducting manner to the casing part (and in particular in the latter).

A magnetic field of the electric coil preferably runs through the core and at least one star contour having the magnetic field concentrators, and through the gap and the wall of the casing part.

If two axially spaced-apart star contours are comprised, a magnetic field of the electric coil preferably runs axially through the core, axially through the wall of the casing part, and through both star contours having the magnetic field concentrators, and the gaps between the star contour and the core, or the casing part, respectively.

In particularly preferred refinements, at least one electric coil is wound in the axial direction about the core and generates substantially a magnetic field in the radial direction (lying coil).

In particular, the magnetic field concentrators form an external contour which is star-shaped (in the cross section).

The casing part preferably has across at least one axial portion a cylindrical internal surface.

The magnetic field concentrators preferably extend across the external circumference of the core by way of at least one angular segment. In particular, each angular segment is smaller than 150°.

No magnetic field concentrator is preferably disposed outside the angular segment (or the angular segments).

The electric coil which in the axial direction is wound about the core is preferably received on the core outside the angular segment (or the angular segments). The electric coil in this instance is in particular adjacent to the surface.

A maximum (external) diameter of the electric coil in a radial direction within a/the coil plane is preferably larger than a minimum (external) diameter of the core in the radial direction transverse, and in particular almost perpendicular, or else perpendicular, to the coil plane. However, the minimum diameter does not have to be perpendicular to the coil plane.

The electric coil preferably extends axially about at least one arm. A radial gap height between an external end of an arm and an internal surface of the casing part is in particular smaller than a radial gap dimension between the external surface of the first brake component beside the arm and the internal surface of the casing part. The surface of the main body can be configured beside the arm. A surface of a casting compound can also be beside the arm when said casting compound is filled, for example in order to reduce the volume for the magnetorheological medium and in particular the magnetorheological fluid (MRF).

The second brake component is preferably disposed so as to be axially displaceable on the first brake component. In addition, it is also possible to allow for a volumetric compensation in the event of temperature variations.

In preferred embodiments, a click element is arranged at the distal end of the chamber for actuation. Preferably, the click element gives a tangible feedback when pressed.

Preferably, an elastic membrane separates the chamber (with the magnetorheological medium) from the click element. In preferred further developments, the click element is designed as a snap-action disk. Preferably, a change in the clamped volume of the dome adapted to a cross-sectional area of the axle multiplied by an axial offset of the dome when actuated. This enables an axial displacement of the casing part relative to the core when the click element is actuated, in which no volume compensation or only a small volume compensation is required for the axle entering the chamber.

In a particular embodiment, the second brake component by way of two bearing points of dissimilar external diameter is rotatably received on the first brake component so as to, by way of an axial displacement, cause a volumetric variation in a chamber configured between the first brake component and the second brake component.

It is preferable for at least one shielding device for at least partially shielding the sensor device from a magnetic field of the electric coil, or for shielding other magnetic fields, to be comprised.

The shielding device preferably comprises at least one shielding member that at least in portions surrounds the magnetic ring unit, wherein the shielding device comprises at least one separation unit disposed between the shielding member and the magnetic ring unit, and/or at least one magnetic decoupling device disposed between the shielding member and the casing part.

The separation unit and/or the decoupling device has/have in particular a magnetic conductivity which is less than that of the shielding member by a multiple.

The shielding device can be composed of a plurality of parts and comprise, for example, at least one, or else two, axial annular disk(s) and at least one annular sleeve.

It is preferable for the shielding device and the magnetic ring unit to be disposed so as to be mutually spaced apart. A spacer can be disposed therebetween. In simple design embodiments, a plastics material part such as an injection-molded part can be disposed therebetween and keep the parts at the defined mutual spacing.

Configured between the brake components is preferably (at least) one closed chamber (which is externally sealed). The second brake component at a first end of the closed chamber is rotatably received and in particular mounted (on a first bearing point) on the first brake component, wherein the closed chamber is filled substantially or completely with the magnetorheological medium. The magnetorheological medium may be a magnetorheological fluid which contains carbonyl iron particles. It is also possible for the magnetorheological medium to be (dry or pulverulent) carbonyl iron powder (without a liquid component).

The second brake component is preferably received and in particular mounted so as to be axially displaceable on the first brake component such that a volume of the closed chamber is varied as a result of the relative axial displacement of the brake components in order to make available compensation for temperature-related volumetric variations.

It is advantageous for the electric coil in the axial direction to be wound about the core and to generate substantially a magnetic field in the radial direction. This results in the advantage that a stronger braking moment can be achieved by increasing the length of a magnetic field concentrator in the axial direction. At the same time as the magnetic field concentrator is increased in length, the electric coil which extends in the longitudinal direction of the first brake component can also be increased in length (in an expedient manner). A larger passage area (cross-sectional area passed through by the magnetic field) for the magnetic field is made available by an electric coil which is configured so as to be longer in the axial direction. For this reason, an increase in length of the first brake component in the axial direction also causes an enlargement of the cross section of the core. As a result, a stronger braking moment can be achieved by increasing the length of the first brake component in the axial direction.

In preferred design embodiments, at least part of the magnetic field concentrators are composed of a magnetically conductive material. It is also possible for part of the transmission components to be composed of a magnetically non-conductive material. When magnetic field concentrators which are composed of a magnetically conductive material are used, and transmission components which are composed of a magnetically non-conductive material are simultaneously used, the magnetic field is thus concentrated in the region of the magnetically conductive magnetic field concentrators. This leads to the concentration of the magnetic field (increase in the magnetic field strength) and to a local amplification (magnetic field line concentration). For example, as a result, the magnetic field strength in the gap is increased from values of below 350 kA/m up to 1000 kA/m or more. The (high or) concentrated field strength attracts more carbonyl iron particles from the magnetorheological fluid, this causing a carbonyl iron accumulation (clustering). This in turn permits higher shear stresses and thus braking moments to be generated.

As the correlation between a generatable braking moment and the strength of the magnetic field is not linear, and because the generatable braking moment becomes disproportionally stronger as the magnetic field increases in strength, a considerable amplification of the generatable braking moment can be achieved as a result (at an identical installation space/identical dimensions). However, it is also possible for a correspondingly smaller number of magnetic field concentrators to be chosen.

In the event that higher braking moments in the given installation space are required than in the prior art, while at the same time requiring (very) low production costs, the axial width of the magnetic field concentrator can be embodied so as to be very small and as a continuous disk (closed contour). For reasons of production costs, the star-shaped contour, or radially or axially projecting arms of a similar design with intervening spaces, can be dispensed with. The specially chosen (very) small width and the special contour of the magnetic field concentrator herein also concentrate the magnetic field and lead to the high field strengths (in the (annular) gap as described above, and thus to the concentration of carbonyl particles (clustering). While the field strengths in the effective gap, due to the larger transition area, are not as high as in the case of individual arms, said field strengths are sufficient for many applications, in particular in the presence of severe cost pressure.

In all design embodiments it is not necessary for the diameter of the first brake component to be increased in order for the generatable braking moment to be increased. This is therefore very important because many potential applications do not permit any larger external diameter of a braking device, or a larger external diameter would be a serious competitive disadvantage (for example an excessively large lateral adjustment wheel in a wristwatch or in a scrolling wheel of a computer mouse or in a thumb wheel on a motor vehicle). In order for the braking moment to be amplified/increased, the first brake component can be configured so as to be axially larger, this not being a disadvantage, or a smaller disadvantage, in terms of construction space.

In all design embodiments it is preferable for the casing part to be configured on a rotary button or a rotating wheel, or for said casing part to comprise the latter. The rotating part can preferably be configured integrally with the rotary button or the rotating wheel. In such design embodiments it is preferable for the rotary button, or the casing part, to be configured "pot"-shaped. The "lid" of the casing part can be integrally connected to a rotating part configured as a sleeve part, or be separately fastened thereto.

The casing part is preferably composed of a magnetically conducting material, or comprises a magnetically conducting sleeve part and makes available an external ring for the magnetic field. The magnetic field for generating a braking moment runs through the first brake component and passes through the gap on the magnetic field concentrators, the latter being configured to be magnetically conducting. From the magnetic field concentrators, the magnetic field enters the casing part. In the latter, the magnetic field lines run back before the magnetic field lines enter the first brake component again. In this way, a closed magnetic circuit, or closed magnetic field lines, are present.

Under the influence of a magnetic field during a relative rotation of the first brake component and the second brake component, a wedge effect is configured on the magnetic field concentrators, such as is described in principle in WO 2012/034697 A1. The disclosure of this publication is completely incorporated in this application. In the present invention, the braking moment is likewise generated as a result of the wedge effect or the clustering on the magnetic field concentrators even when the magnetic field concentrators cannot rotate about themselves but are fastened to the first or the second brake component.

At least one radial wall thickness of the casing part, or of the sleeve part of the casing part, is preferably at least half the size of a gap width of the gap and/or a radial length of a magnetic field concentrator. A radial wall thickness (of the sleeve part) of the casing part is preferably larger than ¾ of the gap width of the gap. The radial wall thickness (of the sleeve part) of the casing part can in particular also be larger than a radial length of a magnetic field concentrator. As a result of a sufficient wall thickness of the casing part, which is composed of a magnetically conductive material, or of the sleeve part of the rotating part, it can be guaranteed that the desired field strength of the magnetic field can be generated in the region of the rolling members so as to be able to generate a high braking moment.

In all design embodiments it is preferable for a length of the first brake component in the axial direction to be larger than a length of a magnetic field concentrator in the axial direction. When the magnetic field concentrator is configured so as to be shorter in the axial direction than the first brake component, this leads to a three-dimensional concentration of the magnetic field in the peripheral region of the magnetic field concentrator. The magnetic field can practically pass through the gap only in those portions where there is no magnetic field concentrator.

A length of the gap in the axial direction is preferably at least double a length of a magnetic field concentrator in the axial direction. It is also possible and preferable for two or more magnetic field concentrators to be disposed successively in the axial direction.

The first brake component is preferably configured so as to be substantially cylindrical and comprises a main body, which is at least in sections rotationally symmetrical or cylindrical, as the core, and the electric coil or the electric coils. It is also possible for a ball for mounting a rotary button to be comprised, said ball potentially being disposed centrally on the distal end so as to make available a simple and low-friction mounting between the first brake component and the second brake component.

When using a "lying coil" the electric coil can be wound in axial grooves and transverse grooves of the cylindrical main body (of the first brake component). When using a "radial coil" the electric coil can be wound in an encircling groove. The respective grooves are preferably at least partially filled or encapsulated with a casting compound. It is prevented as a result that magnetorheological medium or magnetorheological fluid enters the region of the coil wires. This could lead to the fluid decomposing.

The mount preferably has a cable conduit. Connector cables for the coil and/or sensor cables and the like can be routed through the mount, or the cable conduit of the mount. Easy assembling and a cost-effective production are made possible as a result.

The mount preferably has a receptacle for connecting in a rotationally fixed manner to the first brake component. The mount here can receive the first brake component in a force-fitting and/or form-fitting manner. During operation, the braking moment between the first brake component and the second brake component is dissipated by way of the mount.

The mount preferably has a cylindrical running face for a bearing, and supports the casing part so as to be rotatable on the mount.

A seal for sealing the gap is preferably disposed on the cylindrical running face, wherein the seal is in particular disposed so as to be closer to the gap than the bearing. As a result, the bearing is reliably protected in relation to the magnetorheological medium. Such a design embodiment enables a compact construction and a reliable operation. The bearing can be, for example, a friction bearing or a rolling bearing.

The cylindrical running face is preferably hardened and/or has a surface quality which is superior to that of the radially outer surface of the receptacle. Manufacturing costs can be reduced as a result.

In advantageous design embodiments, the cylindrical running face has an external diameter which is smaller than an external diameter of the receptacle of the mount by at least 3 mm.

The mount is preferably fastened to a console or to another component.

In preferred refinements, a device component comprises at least one magnetorheological braking device as described above. Such a device component can comprise at least one user interface, an operating panel, a display, a touch-sensitive display with or without haptic feedback, and/or at least one sensor.

The use is also possible in a haptic operating device which comprises at least one magnetorheological braking device. Furthermore comprised are preferably a user interface, an operating panel, a display, a touch-sensitive display with or without haptic feedback, and/or at least one sensor. Besides enabling the operation, such a design embodiment simultaneously enables the display or output of information during the operation. In this way, an operating button which at the same time has an output display is made possible, for example.

In all design embodiments it is possible for a pressure-sensitive sensor to be attached to the mount, or for the mount to be assigned such a sensor. For example, a pressure-sensitive sensor can be attached in the mount. However, it is also possible for a piezo sensor to be attached to the lower part, etc. The mount can also be configured in two parts and register a mutual axial displacement of the two parts. Haptic feedback can take place in the process.

In all design embodiments it is preferable for a difference between an available internal diameter (of the sleeve part) of the casing part and an external diameter of the first brake component to be more than 3 mm and less than 90 mm. It is likewise preferable for an external diameter of the (sleeve part of the) casing part to be between 5 mm or 10 mm and 120 mm. A height of the casing part is preferably between 5 mm and 120 mm. In all design embodiments it is preferable for a control device to be comprised, said control device by way of the electric coil being configured to initiate a variable braking effect.

Overall, the present invention particularly preferably operates according to the fundamental principle of wedge-action clamping, wherein a magnetic field concentrator slides along the walls at a specific spacing, or optionally rolls on said walls. The wedge effect is created by a magnetic field so that a high braking moment is able to be generated.

Moreover, better scalability can be achieved by using a "lying coil". As a result, it is possible for a greater braking moment that is able to be scaled to be generated by means of longer magnetic field concentrators and an axially longer electric coil. The diameter of the first brake component here does not have to be chosen larger in order for a corresponding magnetic field to be directed through said first brake component, because the area of the core (cross-sectional area) becomes larger as the core is extended in axial length. The axial length can optionally also be significantly reduced if only a relative minor braking moment is required. The installation space can be accordingly adapted.

A further advantage lies in that the routing of the electrical connector cable for the electric coil is possible in a simple manner as with a view to volume production. A tightness of the magnetorheological braking device and scaling can be made possible by way of simple means.

In principle, a greater moment can be generated by the magnetorheological braking device across longer magnetic field concentrators (in the axial direction), because the effective length is increased. At the same time, it is guaranteed by the larger core area that the magnetic field concentrators are always exposed to a corresponding magnetic flux density. The magnetic field strength at the "wedge" on the magnetic field concentrators can be chosen higher than in the prior art. Long magnetic field concentrators or a plurality of axially offset magnetic field concentrators to which a sufficiently intense magnetic field can be supplied can be used.

In particular when using a "radial coil", the magnetic field generated by the electric coil runs axially through the core, radially through the magnetic field concentrators and is closed axially by way of the (sleeve part or) the casing part or the external cylinder. The magnetic field lines here are closed once in the one half of the casing part, and for example the lower or left half, and once again in the other half of the casing part, and for example the upper or right half. In simple design embodiments the magnetic flux thus runs substantially in a two-dimensional manner. The configuration of the magnetic field concentrators in terms of length or height is irrelevant here. As a result, arbitrary scaling in terms of the length can be achieved because the magnetic field transmission area increases conjointly.

In contrast, in the case of electric coils ("radial coils") which are wound concentrically about the longitudinal direction of the first brake component, the cross-sectional area in the core remains identical and may form a bottleneck for the magnetic field as long as the diameter is not changed. In rotary buttons in the motor vehicle, the core regularly has a sufficient diameter in order for the desired braking moment to be applied. The required diameter of the first brake component therein is not particularly disadvantageous in terms of the required installation space, the installed dimensions and the weight of the magnetorheological braking device. It is advantageous that the rotating speed of rolling members does not vary with the stationary magnetic field concentrators now used, said rotating speed variation potentially being disadvantageous.

When longer magnetic field concentrators are used, the braking effect of a magnetic field concentrator that is elongate in the axial direction may be better than in the case of two shorter magnetic field concentrators of the same overall length. The reason for this is, inter alia, that the liquid has to be displaced over a longer distance because the periphery is farther away (hydrodynamic pressure). In turn, two short star contours can have advantages by virtue of a symmetrical construction.

In preferred design embodiments, the magnetorheological braking device has a diameter (of the sleeve part) of the casing part of between approximately 5 and 80 mm (+/− 20%), in preferred design embodiments approximately 10 to 40 mm.

Overall, the invention makes available an advantageous magnetorheological braking device ("MRF" brake). The external diameter of the MRF brake here is in most instances predefined, in particular in the case of haptic applications. There are ergonomic guidelines in this regard. Therefore, the core cross section generally cannot be that easily enlarged, because the external diameter increases conjointly therewith (button wheel or thumb wheel or mouse wheel external diameter; area for the fingers). Moreover, a higher blocking moment is required as the external diameter increases, because the moment interval has increased for this reason. (The finger force, thus the (tangential) force between the activating finger(s) and the brake element, or the external surface of the brake element, must or should remain the same because the user is able to apply only a specific force, on the one hand, and the forces required on the fingers (at the fingertips) are important in terms of a comfortable feeling during activation (operating comfort)).

The electrical coil (electric coil) can extend axially in preferred design embodiments. The magnetic field generated by the coil in this instance runs radially through the core, then through the magnetic field concentrators, and is closed by way of the external cylinder (in each case by the opposite halves). This remains identical, irrespective of the height (or the length) of the rolling members or the MRF brake.

The invention achieves the objective of obtaining an ideally simple but nevertheless readily scalable MRF brake with a high braking moment and at the same time a compact external diameter.

A flat material, or a wire with an adapted contour, of copper or any other suitable material can be used instead of a (cylindrical) coil wire.

The core, the magnetic field concentrators and the external cylinder can be made from a simple steel (for example S235), without high requirements in terms of the surface characteristic and hardness, said steel preferably having good magnetic properties. The surfaces which move toward one another and generate the brake moment can be rough or/and have a surface structure (e.g. knurlings, pyramids . . . ).

The core, including the electric coil and the casting compound, are preferably centered in a "mount" and fixed (force-fitting or form-fitting connection), and the counter torque by way of said "mount" can be dissipated to a console, a base plate, a receptacle plate or a housing. The mount preferably has a bore through which the cables are routed. A sealing element (for example an O-ring) seals the cable in relation to the mount or the interior space, so that no liquid from the interior space can makes its way to the outside by way of the cable. In addition to the (coil) cable, a temperature sensor cable or another sensor cable can also be routed through this opening.

The mount can also be produced from a material that is different from that of the core, the rolling member or the external cylinder. The reduction in the diameter of the mount on the running face has the advantage that the frictional radius for the sealing element is decreased, this reducing friction overall. Moreover, due to the resulting increased construction height, a bearing element which has a bearing external diameter that is identical to the internal diameter of the casing part can be used. This reduces the production costs of the casing part; no production-related shoulder (undercut) is required. The preferred rolling member height is between 3 mm and 6 mm, but may also be 1 mm or 2 mm. It is difficult to obtain good bearings or sealing elements in this range, unless the internal diameter of the mount achieves additionally installation height.

A decorative element, or another element, for example a rubberized button, can be fitted over the external cylinder or the casing part.

A ball or a ball-shaped or ball-like component (may also be semi-spherical) can preferably be seen axially at the top, between the external cylinder and the casting compound. Said ball guides the two parts relative to one another. The ball is preferably fixed in the casting compound, and the inner axial end side of the external cylinder rotates relative thereto. A simple, low-friction and cost-effective bearing (bearing point) is achieved in this way. A conical shape or the like is also possible. However, any other type of mounting (for example a friction mounting or a rolling mounting) can also be chosen instead of this type of mounting.

At least one component that is passed through by the magnetic field is preferably at least partially or completely composed of the material FeSi3P.

A star contour can in principle be applied not to the core but also, from the inside, to the surrounding casing part or sleeve part. Such a construction can offer advantages in the basic design of the coil. Space is moreover gained. In this case too, different variants of coils can be chosen. An axial coil, or a "lying coil", is also possible. A coil that is wound about the rotation axis is also possible.

Advantageously, there is no more core material present radially outside the electric coil, because the magnetic field otherwise would be able to be closed thereby, this potentially resulting in magnetic losses. Depending on how the "lying coil" is positioned, it is also conceivable that more than one "lying coil" is used. A radial coil would also be readily conceivable, because the field is closed simultaneously by all "teeth" or magnetic field concentrators in this way.

In preferred refinements of all design embodiments, the maximum generatable torque (field strength profile in the effective gap; wedge effect), and/or the response time (the time until the moment prevails in the event of abrupt energizing or current leaps=step response) is a function of the chosen inlet angle at the arms, or the respective distal ends of the magnetic field concentrators. The angle generated by the external design of the radial end of the arms and of the mating face, and the length of the face, influence that maximum generatable torque and the response time when a magnetic field, or the field strength, is being built up in the effective gap. Flatter (smaller) inlet angles and/or longer faces increase the achievable moment. Larger (steeper) inlet angles and/or shorter faces decrease the response time. Flatter angles are, for example, an angle between 0° and 10°, or preferably between 10° and 20°. Larger angles are between 20° and 30° or between 30 and 45°. It is also possible for negative angles to be implemented, thus curved in the inward direction. For example −5°.

It can also be advantageous to mix different contours/angles/shapes. A pip/tooth of the star contour in this instance generates higher moments at low rotating speeds, the other pip/tooth generates said higher moments at medium rotating speeds, and the third pip/tooth generates said higher moments at high rotating speeds. A braking device that generates high moments across the entire rotating speed range can be made available in this way.

A disk or an annular flange without a star contour is easier to manufacture and can thus be manufactured in a more cost-effective manner. However, the braking output (braking moment) is not the same. Depending on the requirements in terms of installation space, production costs and potential braking moment, either a star contour can thus be used (for higher power densities), or else a continuous disk can be used in the event of lower requirements in terms of the power density but higher requirements in terms of the production costs. The disk can be configured in a rotationally symmetrical manner.

However, besides the dissimilar braking moment of the different contours, dissimilar response times must additionally be taken into account. The more magnetizable material is used in the construction, the longer it takes for the magnetic field to magnetize the entire material and to develop the full output (inductivity). This means that less material decreases the response time of the actuator.

The response/switching times which are required for the application are thus an additional criterion when choosing the contour. These requirements change depending on the customer and the intended application. Very fine ticks/ripple (changing torque) require very short response times (a few milliseconds).

Typical dimensions or values of the contour elements or "teeth" of star contours, respectively, are 5% to 15% of the overall diameter. For example, in one specific design embodiment, the maximum diameter of the star contour (having outwardly protruding contour elements or "teeth") is 36 mm and the height of a contour element or a magnetic field concentrator or the teeth is approximately 2.5 mm, respectively. A minimum diameter is thus 31 mm. This corresponds to a relative size of 7% of the diameter. A star contour having typical deviations from the disk form would be, for example, depressions of 5 to 10% of the overall diameter.

A range of the depth of the depressions is preferably from 0.25% to 25%. In particular between 0.5% and 10%.

The manufacturing costs decrease as the heights of the teeth become smaller. Therefore, it can be advantageous to use only very small deviations from the round disk.

A star contour having comparatively minor deviations from the disk form would be, for example, small concavities of 1 to 3% of the entire diameter.

The width of the star contour can also vary. In preferred design embodiments, the width is between 1 mm and 25 mm. Specifically, widths of 3 mm and 6 mm have been successfully tested.

In particular, the haptic operating device according to the invention is preferably used to generate a high power density of a braking device or a brake unit with a magnetorheological fluid, wherein this is achieved by contour elements which concentrate the magnetic field.

In this way, the carbonyl iron particle is in particular attracted from the environment and concentrated in the transition region of the magnetic field.

The applicant reserves the right to claim a method for generating an increased power density of a braking device having two brake components and having a magnetorheological fluid and at least one electric coil, wherein the increased power density is generated by a stationary brake component and a brake component which moves so as to rotate about the central axis of the stationary brake component and is magnetically directly in contact with the latter, wherein contour elements which concentrate the magnetic field are disposed on one of the two brake components and are in particular connected thereto in a rotationally fixed manner.

A further method serves for generating a high power density having a braking device having a magnetorheological fluid and at least one electric coil, wherein this is generated by a stationary element and an element which moves so as to rotate about the central axis of the stationary element and is magnetically directly in contact with the latter, said elements concentrating the magnetic field.

In particular, carbonyl iron particles are attracted from the environment and concentrated in the transition region of the magnetic field.

The brake component moving so as to rotate about the central axis is preferably integral.

Further advantages and features of the present invention are derived from the exemplary embodiments which are explained hereunder with reference to the appended figures.

DETAILED DESCRIPTION OF THE INVENTION

FIGS. 1a to 1f shows a plurality of device components 200 according to the invention, in which the magnetorheological braking device 1 can be used. The device components 200 here are in each case embodied as a haptic operating device 100.

Figure 1A:
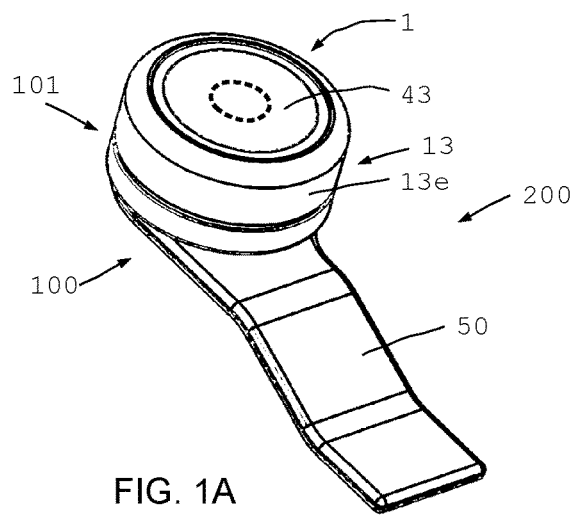
FIGS. 1a-1f show schematic three-dimensional views of device components having a magnetorheological braking device.

FIG. 1a shows a haptic operating button 101. The operating button is fastened by way of the console 50. The operating button 101 is operated by way of the casing part 13 or the sleeve part 13e. The user interface 43 can be additionally utilized for transmitting information.

Figure 1B:
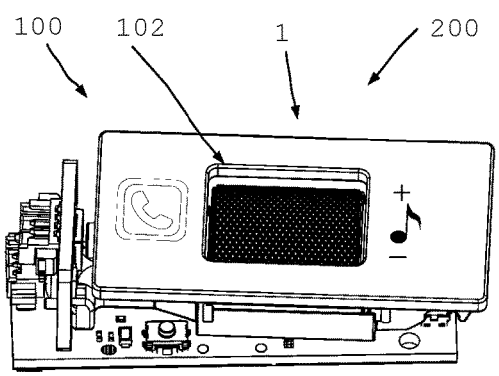

The device component 200 in FIG. 1b is illustrated as a thumb wheel 102 with a haptic operating device 100. The thumb wheel 102 is preferably able to be used in steering wheels, for example. However, the thumb wheel is not limited to this specific application. In general, the thumb wheel 102 can also be used with any other finger, depending on the installation situation.

Figure 1C:
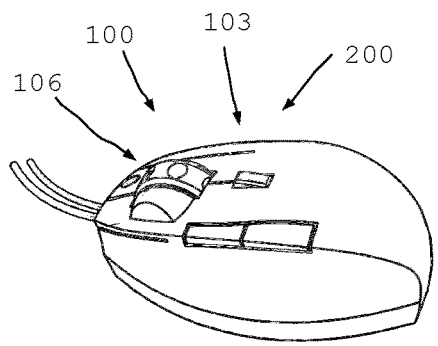
Figure 1D:
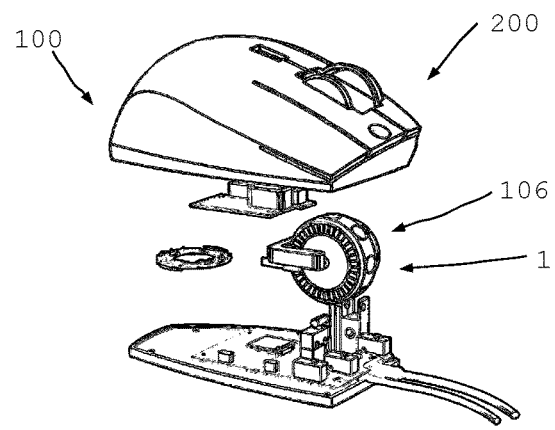
Figure 1E:
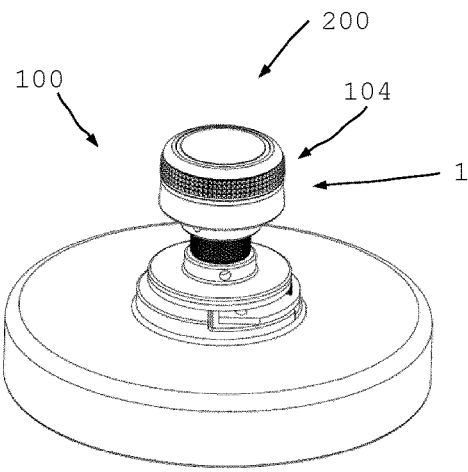
Figure 1F:
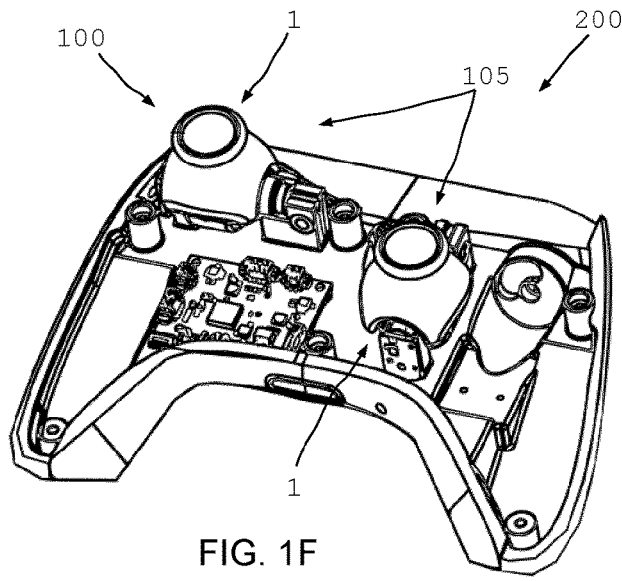

The device component 200 in FIG. 1c and FIG. 1d is embodied as a computer mouse 103. The haptic operating device 100 is disposed in the mouse wheel 106. The magnetorheological braking device 1 can be utilized for controlling haptic feedback.

FIG. 1d shows a joystick 104 as a haptic operating device 100 in which a magnetorheological braking device 1 is disposed. Moreover, the magnetorheological braking device 100 according to the invention is preferably also able to be used in a game pad 105 so as to provide haptic feedback to the player as a function of the game situation.

In these exemplary embodiments, the magnetorheological braking device 1 has a casing part 13 or a rotating part or a sleeve part 13e, which is rotatably received. The torque required for rotating the casing part 13 or the rotating part is adjustable.

A user interface 43 can be disposed on the upper side of the magnetorheological braking device 1. Such a user interface 43 can be configured, for example, as a display device or else as a touch-sensitive input possibility (touchpad, control by movement or gesture, image recognition . . . ).

For example, a haptic operating device 100 can be used for operating machines, medical equipment or for use in and for the motor vehicle. In a vehicle, the haptic operating device 100 can be used, for example, for operating air conditioning systems, radios, the entertainment system, the navigation system, the vehicle distance control system, the driver assistance system, for adjusting the seats and for operating the infotainment system. The use of other apparatuses or other devices is also possible.

Figure 2A:
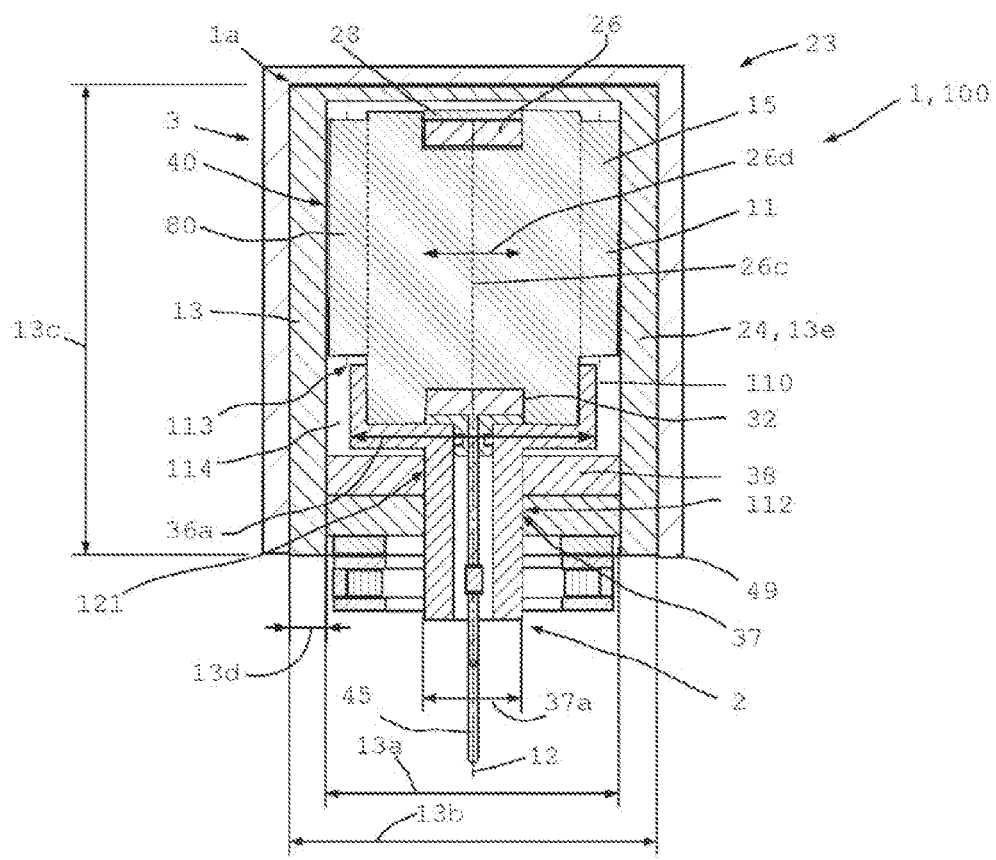
FIGS. 2a-2c show schematic cross sections of a further device component having a magnetorheological braking device.

FIG. 2a shows a device component 200 according to the invention having a magnetorheological braking device 1 according to the invention, in a sectional view. Transverse grooves 32 in which the electric coil 26 of the magnetic field generator 113 at the axial ends of the core 21 are wound can be seen. Connection cables 45 are led out here downwardly.

The magnetic field extends within the core 21 perpendicularly to the coil plane 26c in the radial direction 26d. A casting compound 28 is in each case provided in the axial direction for closure at both ends. A separate seal, for example by way of the plotted O-ring or the like, is provided in the region of the cable conduit 35.

The wall thickness of the presently cylindrical casing part is calculated from the between the external diameter 13b and the internal diameter 13a of the casing part 13.

A length, or height 13c, of the magnetic field concentrator 80 and of the casing part 13, or of the sleeve part 13e, or of the second brake component 3 in the axial direction 20 is preferably between 1 mm and 100 mm, or between 5 mm and 90 mm. A covering 49 can be attached to the outside of the second brake component 3 so that the external appearance of the rotary button 23 is determined substantially by the surface of the covering 49.

The material of the sleeve part 13e or of the casing part 13 overall is magnetically conducting and serves for closing the magnetic circuit. A wall thickness 13d of the sleeve part 13e is preferably half the size of a radial extent of the magnetic field concentrators 80. The casing part 13 forms an external ring 24.

The diameter 36a of the receptacle 36 is preferably significantly larger than the diameter 37a of the cylindrical running face 37. The friction on the seal 38 is reduced as a result. Moreover, standardized bearings can be used.

A (flange-fitted) sensor (rotary encoder, angle transmitter) detects the rotating speed (the rotation angle) of the operating unit.

It is also possible for the core 21 and the mount 4 to be embodied in two parts. The separation preferably runs along the centerline drawn in FIG. 2, this resulting in a left and a right (core) half. The two core halves can be mutually spaced apart by a magnetically non-conducting element (for example a seal). The casting compound volume 28 in this instance is preferably part of the core half (halves), this resulting in a semicircular element having an encircling groove on the separation face for the electric coil 26. Furthermore preferably, the receptacle 36 is also divided into two halves. One receptacle half, conjointly with a core half, can form one part (be integrally embodied), or one core half can be integrally embodied with a complete receptacle unit 36.

The haptic operating device 100 having the magnetorheological braking device 1 here is unilaterally mounted. The second brake component 3 here is received only at the first end of the closed chamber 110, on an end portion 121 of the first brake component 2, that is to say that the second brake component 3 is mounted only by the mounting 30 at the first bearing point 112. In the event of a variation of the volume within the closed chamber, the second brake component 3 can easily move back and forth. It is again assumed here that the first brake component 2 is stationary. In this case, part of the diameter 116 of the first brake component 2 moves in or out at the first bearing point 112. The volume 114 of the closed chamber 110 changes. Advantageously, the system within the freedom of movement provided is practically always at the ambient pressure. Any additional stressing of the seal 38 is prevented.

Figure 2B:
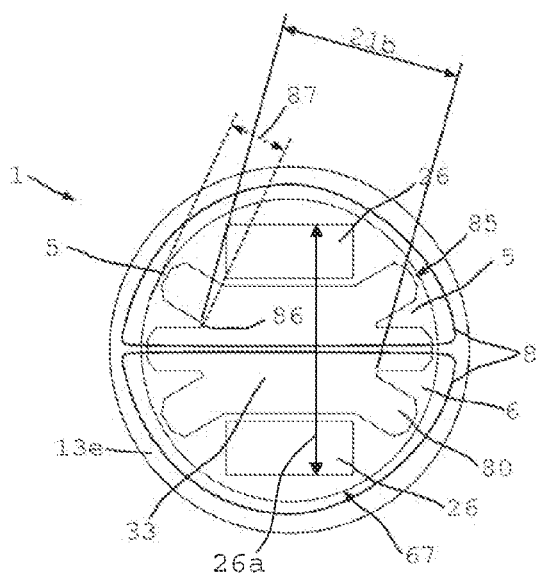
Figure 2C:
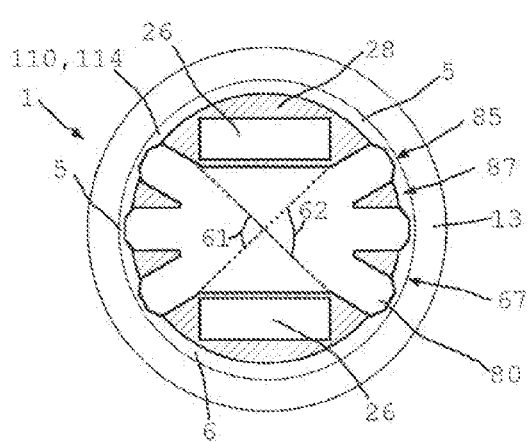

FIGS. 2b and 2c show various schematic cross sections of the magnetorheological braking device 1, said cross sections being able to be used in the device components 200 as per FIG. 2a, and also in other exemplary embodiments.

The inner brake component 2 is configured to be stationary, and is surrounded by the continuously rotatable brake component 3. The second brake component 3 has a casing part 13 which is rotatable about the first brake component and is configured so as to be hollow and cylindrical on the inside. The encircling gap 5 between the first brake component 2 and the second brake component 3 can be seen. The gap 5 here is at least partially, and in particular completely, filled with a magnetorheological medium 6.

The first brake component 2 has the core 21, which extends in the axial direction 20 and is made of a magnetically conductive material, and an electric coil 26 which in the axial direction 20 is wound about the core 21 and defines a coil plane 26c. The magnetic field 8 of the electric coil 26, transversely to the axial direction 20, extends through the first brake component 2, or the core 21.

It can be clearly seen that a maximum external diameter 26a of the electric coil 26 in a radial direction 26d within the coil plane 26c is larger than a minimum external diameter 21b of the core 21 in the radial direction 25 transverse, and for example perpendicular, to the coil plane 26c.

The magnetic field concentrators 80 protrude radially outward from the main body of the core 21. The profile of the magnetic field 8 in an exemplary manner is plotted in FIG. 2b.

The electric coil is disposed outside the angular segments 61 and 62 (cf. FIG. 2c). No magnetic field concentrators 80 are situated outside the angular segments 61 and 62.

The cores 21 have outwardly projecting arms 83 as magnetic field concentrators 80, which from the main body 33 project radially outward. The chamber 110 between the core 21 and the casing part 13 in FIGS. 2b and 2c is completely filled with MRF.

The maximum external diameter 26a of the coil 26 is larger than the minimum core diameter 21b. The radial extent of the gap 5 varies across the circumference. There is only a minor radial gap height 85 at the outer ends of the magnetic field concentrators 80, while a radial gap dimension 87 between the brake component 2 and the brake component 3 at other locations is significantly larger.

However, the radial gap height 85 between an outer end of an arm 83 and an internal surface 67 of the casing part 13 is significantly smaller than a radial gap dimension 87 between the external surface 86 (i.e. the core 21 per se or else a surface of a casting compound 28 on the core) of the first brake component 2 beside the arm 83 and the internal surface 67 of the casing part 13.

FIG. 2c shows a variant of FIG. 2b, in which the chamber 100, in order to decrease the MRF volume, by way of a cylindrical portion is filled with casting compound 28. As a result, the required volume of MRF drops. The star contour 40, i.e., the magnetic field concentrators 80, project (radially) into the gap 5, so that an encircling gap section 40d with a variable gap height 40c results in the region of the star contour 40. The radial gap dimension 87 (maximum gap height) is considerably reduced, but remains substantially larger (at least by a factor of 2 or 3 or 5 or 10) than the (minimum) (radial) gap height 85. It is ensured as a result that the described wedge effect arises. The MRF particles interlink in the acute regions and form a type of wedge which leads to a significant braking moment. The magnetic field concentrators 80 in FIGS. 2b and 2c form a type of radial arms 83.

Figure 3A:
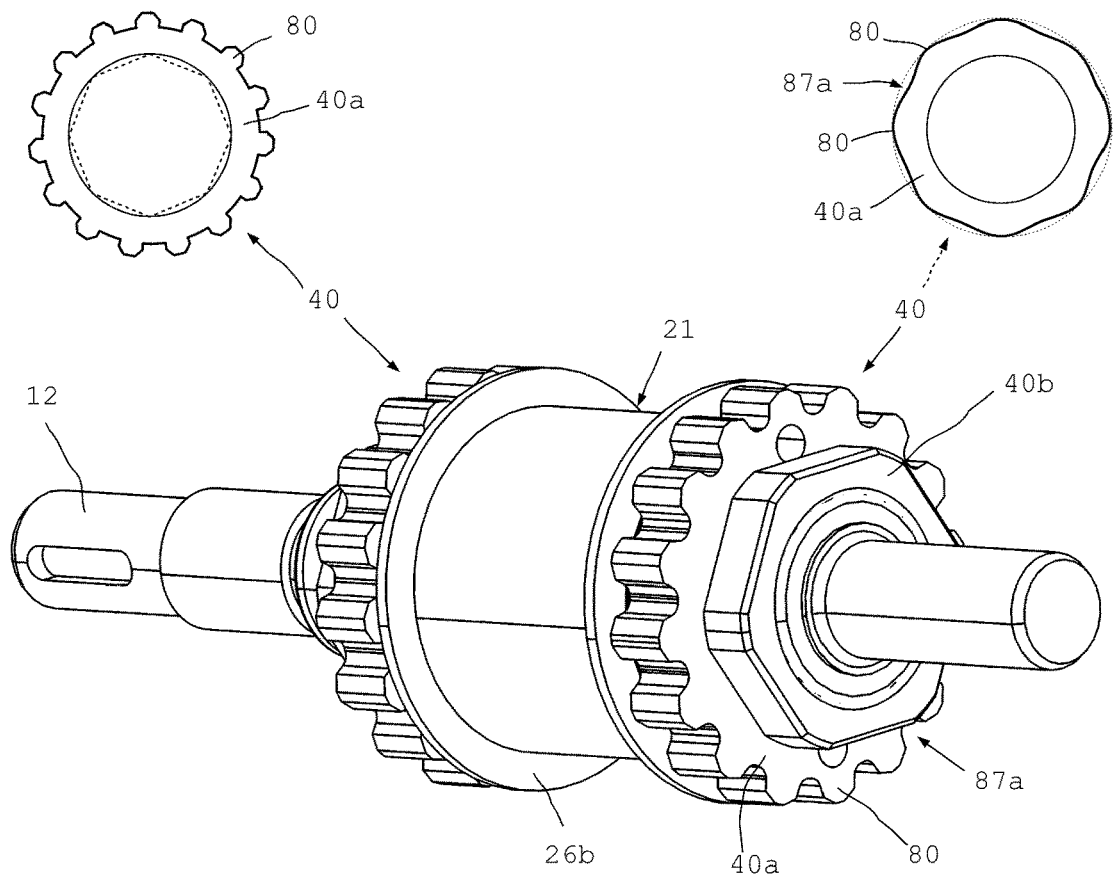
FIGS. 3a-3b show a magnetorheological braking device having a wedge damper having two star contours in each case on one side of the electric coil.
Figure 3B:
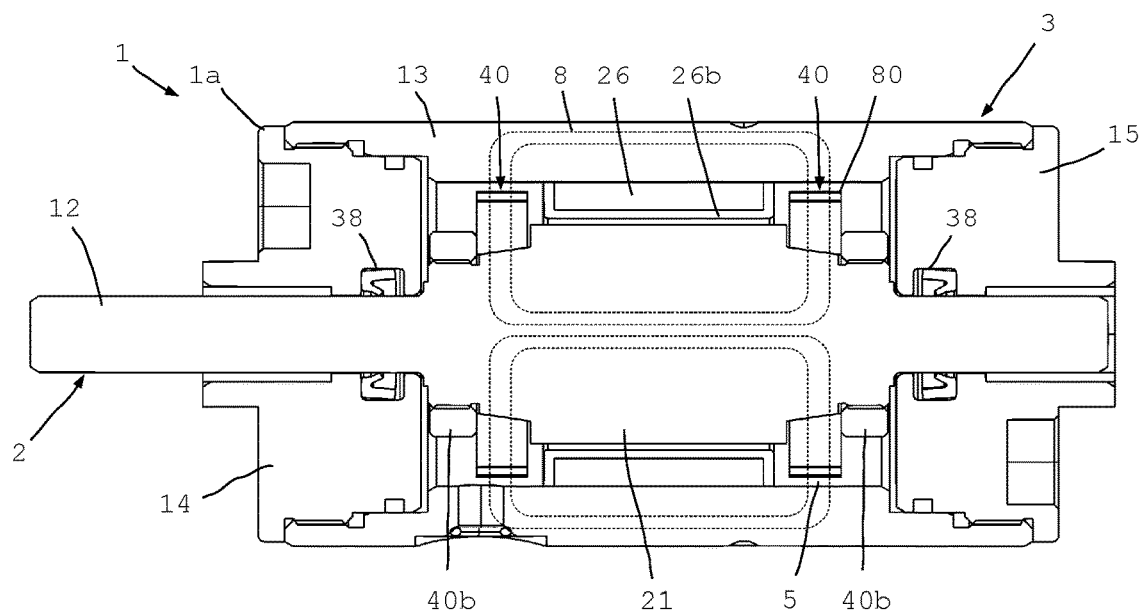

FIGS. 3a and 3b show another magnetorheological braking device 1 for a haptic operating device 100. The magnetorheological braking device 1 comprises a brake housing 1a which here (FIG. 3b) is composed substantially of the two end pieces or covers 14, 15, respectively, and the casing part 13.

The first brake component 2 comprises the axle 12 which on at least one side in a sealed manner is led out of the brake housing 1*a*. The second brake component 3 comprises the brake housing 1*a*. The operating button 101 is received or configured on the outside of the brake housing 1*a*.

The axle 12 can also have a through opening and a longitudinal bore, for example.

The first brake component 2 is typically received in a rotationally fixed manner on a console 50, or on other parts or components, by way of a mount 4 which is not visible here. In this instance, at least the casing part 13 forms a rotatable part of an operating button 101 or the like. The torque required for rotating the casing part 13 is adjustable. However, it is also possible for the brake housing 1*a* to be assembled in a rotationally fixed manner and for the axle 12 to be rotatable.

The magnetorheological braking device 1 in FIG. 3*a* is illustrated without an external brake housing 1*a* and without a casing part 13. Comprised here are two star contours 40 which in the axial direction 20 along the axle 12 are received so as to be mutually spaced apart on the core 21. Each star contour 40 is configured as a separate part and here, by way of a separate screw nut 40*b*, is fixedly clamped to the core 21. The star contour on the inside can be of a cylindrical or conical design.

The core 21 and the star contours 40 can optionally also have mutually adapted non-round external or internal contours, respectively, so as to guarantee that the star contour 40 is received in a rotationally fixed manner on the core 21. A view of a star contour 40 which on the inside has a through opening is shown at the top left in FIG. 3*a*. The internal contour can be configured so as to be cylindrical (solid lines) or else non-round (polygon, oval, etc.) (dashed lines).

The magnetic field concentrators 80 are configured radially outside on the star contour 40. A depression 87*a* is in each case configured between the individual magnetic field concentrators 80. Here, all magnetic field concentrators 80 of a star contour 40 are integrally configured on the star contour 40. Rotatable rollers or other rotating elements are as magnetic field concentrators 80 and also otherwise not present.

The two star contours 40 of the magnetorheological braking device 1 as per FIG. 3*a* can be identically configured. However, it is also possible that dissimilar star contours 40 are disposed on the right and the left end. In particular, the magnetic field concentrators (which in all design embodiments may also be referred to as contour elements) on the star contours 40 can also be dissimilarly shaped on the right and the left (cf. the star contours depicted individually in each case in the upper part of FIG. 3*a*). It is also possible for two (or three) dissimilar star contours to be in each case received on one or each end. The contour elements here can be of dissimilar geometric designs and differ from one another in terms of the dimensions.

It can be seen in the cross section as per FIG. 3*b* that the axle 12 (also referred to as a shaft) by way of seals 38 is sealed in relation to the brake housing 1*a*. The coil mount 26*b* on which the electric coil 26 is wound is received between the two star contours 40. The electric coil 26 can be immediately and directly adjacent to the casing part 13 and in this instance is held so as to be magnetically isolated from the core 21. Or, the electric coil 26 can be immediately and directly adjacent to the core 21 and in this instance is held so as to be magnetically isolated from the casing part 13.

A magnetic field line 8 is plotted by way of example. The magnetic field runs between the star contours 40 in a substantially axial manner through the casing part 13, and in the region of the two star contours 40 passes through the gap 5 there in an approximately radial manner, and is concentrated by the magnetic field concentrators 80 so that a wedge effect results in the region of the magnetic field concentrators 80. The magnetic field within the core 21 is closed in the axial direction 20.

In principle, the magnetorheological braking device 1 has a wedge bearing having two star contours 40. In the center there is a magnetically conducting axle or shaft 12 about which an electric coil 26 is wound radially. The electric coil 26 generates a magnetic field 8 which is amplified by the shaft 12 as the core 21. The magnetic field lines 8 lead through the star contour 40 on the one side, onward by way of the magnetically conducting external wall in the casing part 13 to the second star contour 40 on the other side by way of which the field lines close to the axle or shaft 12 again. The magnetic field 8 is very efficiently utilized in this way. MRF as a damping medium is situated in the gap 5 between the star contour 40 and the external wall (casing part 13).

Various star contours can be attached in this construction. To this end, the shaft 12 has a conical receptacle here onto which the annular flanges 40*a* having the respective star contours 40 configured thereon (e.g. machined into the latter) are pushed. A threaded nut 40*b* behind the annular flange 40*a* then presses the annular flange 40*a* onto the shaft 12 when said threaded nut 40*b* is tightened.

Figure 4:
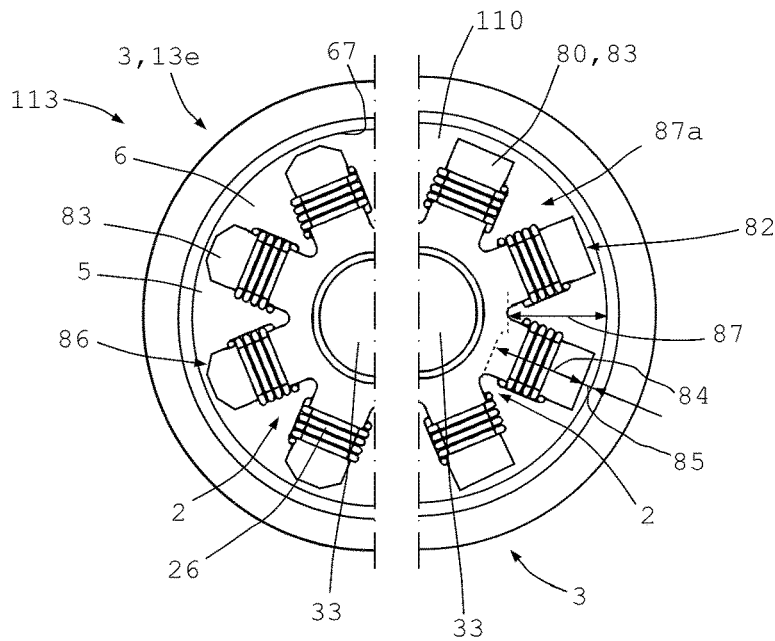
FIG. 4 shows another cross section of a magnetorheological braking device.

FIG. 4 shows two schematic cross sections of other embodiments having a (cylindrical) main body 33. The star contour having the magnetic field concentrators 80 are configured by individual, outwardly projecting radial arms 83, wherein the radial arms 83 are configured integrally with the core 21 and are composed of a material which is positively magnetically conducting.

Each individual arm 83 here is wrapped by an electric coil 26 of the magnetic field generator 113. The electric coils 26 are preferably conjointly actuated, but can also be actuated differently and/or individually. The distal ends 82, here the radially outer ends 82, of the arms 83 can be configured so as to be wedge-shaped, radiused or else angular. In the case of radially inwardly projecting arms 83 as magnetic field concentrators 81, the radially inner end as the distal end 82 can accordingly be configured so as to be wedge-shaped, radiused or else angular. The maximum generatable moment and the response time are influenced by the shape.

The arm height 84 is significantly larger (by a factor of 10, 50, 100 and far more) than the radial gap height 85 between an external end of an arm 83 and an internal surface 67 of the casing part 13.

Figure 5:
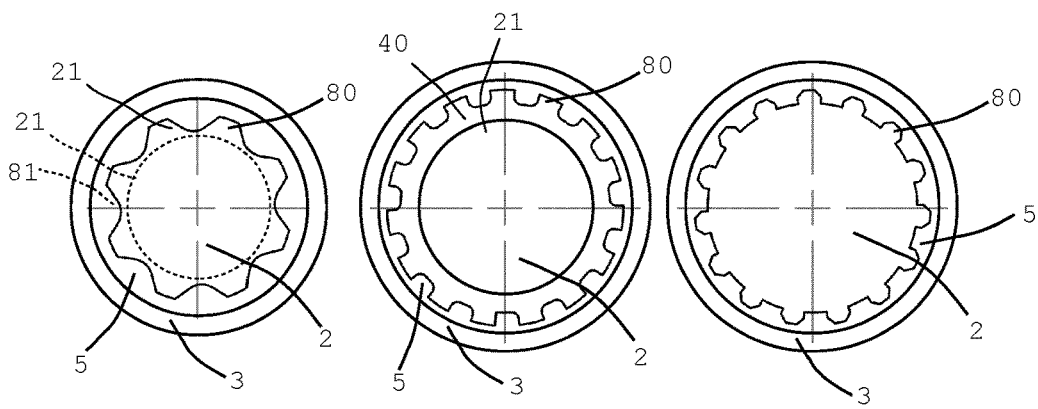
FIG. 5 shows further schematic cross sections of a magnetorheological braking device in a sectional view.

However, the radial gap height 85 between an external end of an arm 83 and an internal surface 67 of the casing part 13 is significantly smaller than a radial gap dimension 87 between the external surface 86 (core 21 or else a surface of a casting compound 28) of the first brake component 2 beside the arm 83 and the internal surface 67 of the casing part 13. The ratio of the radial gap dimension 87 to the radial gap height 85 is preferably more than 2, 5 or 10 or more. A certain enlargement is important with a view to the formation of the wedge. The star contour 40 or the magnetic field concentrators 80 protrude or protrudes radially into the gap 5, so that in the region of the star contour 40 there is formed a circumferential gap section 40*d* with variable gap height 40*c*. Three different external contours of a core 21 on a casing part 13 which is configured with a cylindrical cavity are depicted in FIG. 5. The magnetic field concentrators 80 which project radially outwardly on the star contours 40 may have different shapes. The outwardly protruding magnetic field concentrators 80 form a gap section 40*d* at the gap 5 with a variable gap height 40c along the circumference, so that the magnetic field 8 in the region of the magnetic field concentrators 80 is bundled when said magnetic field 8 transitions from the core into the casing part 13. The star contours 40 are formed by annular flanges having magnetic field concentrators 80 outwardly projecting from the latter. The annular flanges are in each case configured so as to be hollow and, on the inside, can be shaped so as to be non-round, in order to guarantee a rotationally fixed connection to the core, the latter in this instance also being designed so as to be non-round there.

A variant in which the magnetic field concentrators 81 project inward and the core 21 is provided on the inside is illustrated in a purely schematic manner by dashed lines in the left image of FIG. 5. In this instance, a reversed image is created. Different properties can be achieved by the shaping of the ends of the magnetic field concentrators 80 and/or 81. In this way, the focus can be set on a higher braking moment or a faster response time. The gap section 40d with the variable gap height can be seen in all three variants, but is identified with a reference numeral only in the right-hand variant.

Figure 6:
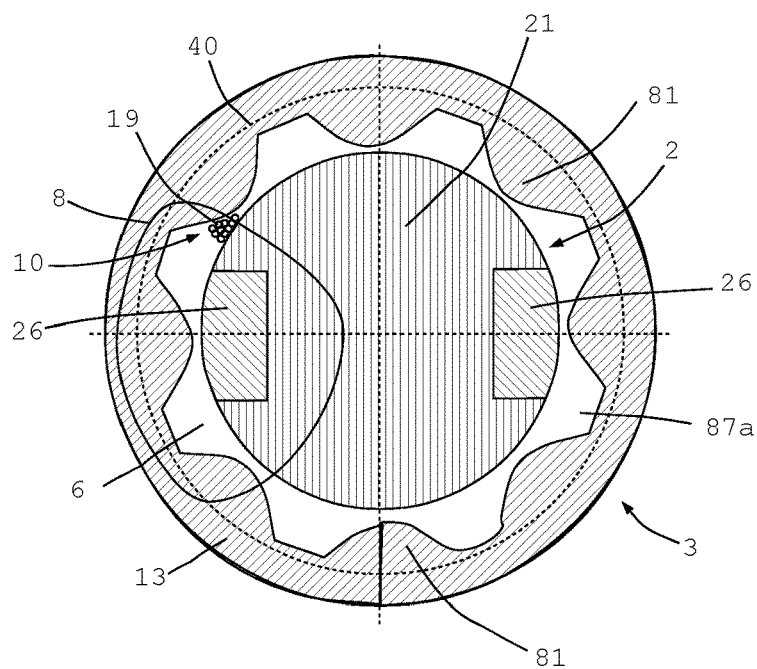
FIG. 6 shows another schematic cross section of a magnetorheological braking device.

FIG. 6 shows a schematic variant having a central cylindrical core 21 and a casing part 13, magnetic field concentrators 81 projecting periodically in a radially inward manner from the latter. A highly schematic magnetic field line 8 which radially passes through the gap 5 between the core 21 and a magnetic field concentrator 81 is plotted in the drawing. A cluster of the particles 19 of the MRF interlinks at the constriction in the gap 6 filled with the medium 6, and in an acute region 10 forms a wedge (cluster) which generates a high braking moment.

Besides the variant illustrated in which the electric coil in the axial direction is wound about the core, a variant in which the electric coil 26 is wound radially about the rotation axis (2) is also possible.

FIGS. 7a to 7e show a further embodiment of a device component 200 which possesses a magnetorheological braking device 1 and comprises brake components 2 and 3. A "lying or axial coil" is again used, in which the electric coil 26 in the axial direction 20 is wound about the core 21, and said electric coil 26 again has a maximum radial coil diameter 26a which is larger than a minimum core diameter 21b of the core 21. Here too, magnetic field concentrators 80 which project radially outward and concentrate the magnetic field in the thin radial gap and ensure the wedge effect are provided. This is not conventional shear damping, because the gap height of the gap 5 massively varies across the circumference. Horizontal lines which show the radial starting point for the magnetic field concentrators 80 are plotted in the drawing here. The gap height outside the magnetic field concentrators 80 is very much larger (here by a factor of >50 or 100 or 1000).

The device component 200 here is embodied as a haptic operating device 100 and in detail embodied as an operating button 101. The second brake component 3 at the first end 111 of the closed chamber 110 is received on the bearing point 112. Moreover, the second brake component 3 at the second bearing point 118 at the second end 115 of the closed chamber 110 is received on the first brake component 2. As a result of the mounting, forces in the (global) radial direction 122 are absorbed, while the brake components 2, 3 are furthermore axially displaceable relative to one another.

The mounting here is implemented by means of a stub axle 119 having the diameter 117 at the second bearing point 118. The annular seal 46 prevents the magnetorheological medium 6 flowing into the region behind the stub axle 119.

The diameter 117 at the second bearing point 118 here is embodied so as to be considerably smaller than the diameter 116 at the first bearing point 112. In this way, a volumetric variation in the event of an axial displacement is enabled here too. Temperature-related volumetric variations and volumetric variations caused by leakages can be compensated for. To this end, a relative axial displacement of the first brake component 2 in relation to the second brake component 3 takes place. In order for the throttle effect by way of the gap 5 in the event of an axial displacement to be reduced, a compensation duct 120 which connects the two regions close to the bearing points 112, 118 can be provided.

Moreover, a sensor device 70 for detecting an angular position of the haptic operating device 100 is present here too. The magnetic field sensor 72 is integrated in the stationary receptacle 4, or the first brake component 2. The cable 45 of the magnetic field sensor 72, i.e. the sensor line 73, at the receptacle 36 is routed outward by way of the cable conduit 35.

Figure 7A:
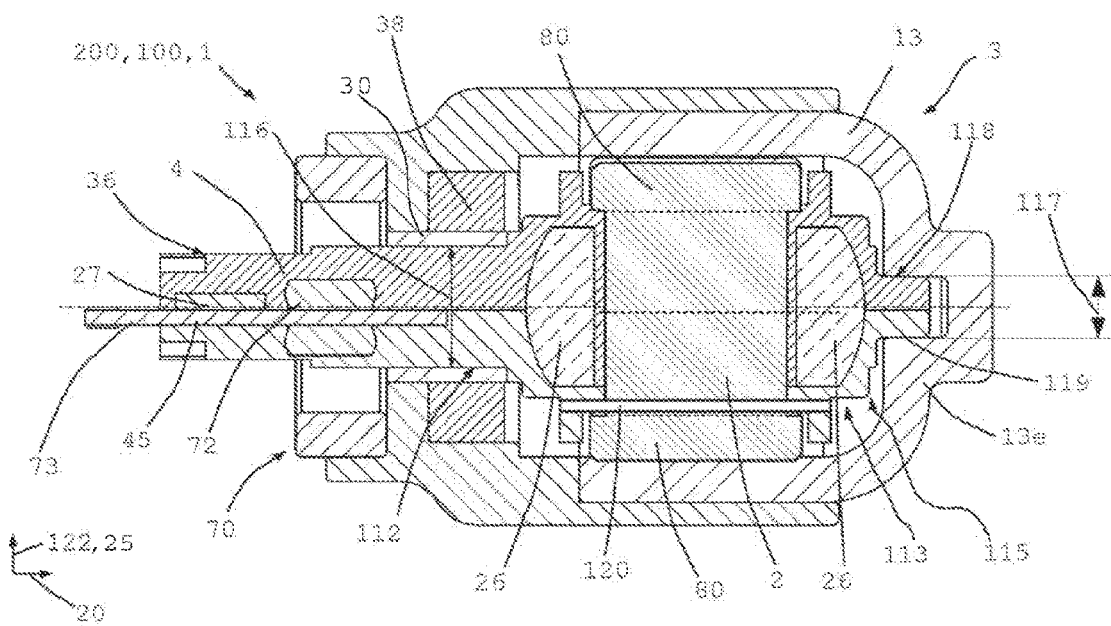
FIGS. 7a-7e show a further device component.
Figure 7B:
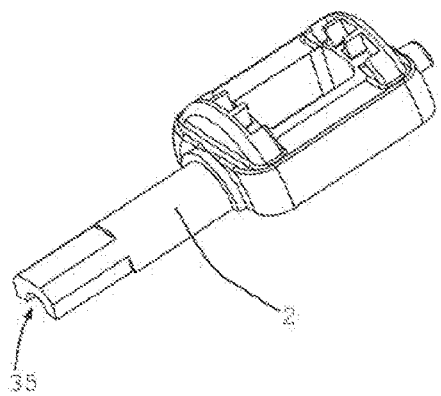
Figure 7C:
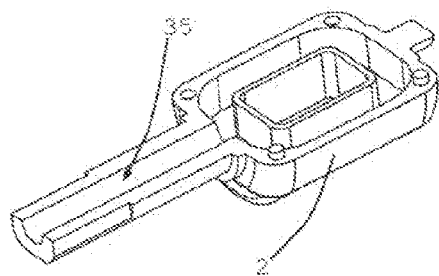

As is illustrated in FIGS. 7b and 7c, the first axle part, or the mount 4 of the brake component 2, can preferably be embodied in two parts. As a result, the assembling of the electrical lines, and in particular of the sensor line 73, within the first brake component 2 is simplified above all. The cables can be installed by way of the open cable conduit 35.

Figure 7D:
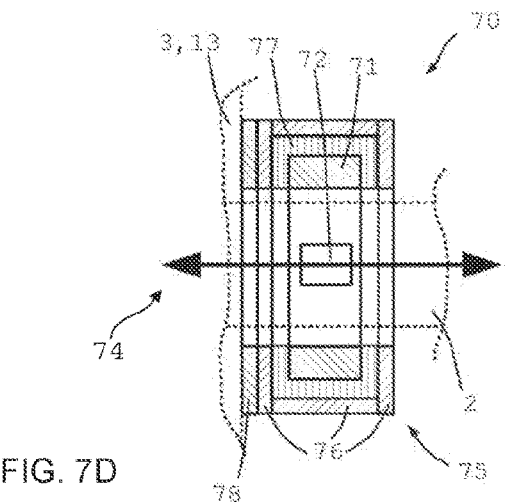
Figure 7E:
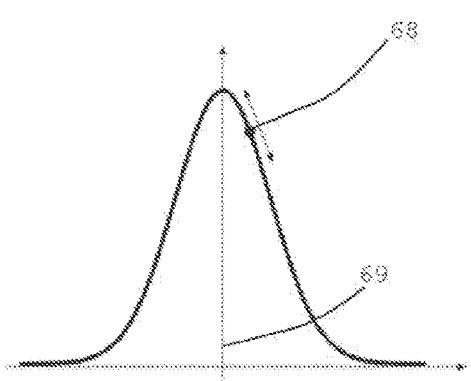

The sensor device 70 is illustrated once more in detail in FIG. 7d. The first brake component 2 and the second brake component 3, here embodied as the rotating part, are only indicated (by dashed lines). The sensor device 70 by way of the decoupling device 78 is supported in a magnetically decoupled manner on the rotatable second brake component 3. The shielding device 75 here is composed of three shielding members 76 which mitigate straying of the magnetic field 8 of the electric coil 26. Moreover present is also a separation unit 77 for the magnetic separation. The magnetic ring unit 71 is utilized for measuring the orientation, or the rotation angle, of the magnetorheological braking device 1. The magnetic field sensor 72 is disposed within the first brake component 2. Moreover, small relative axial displacements can be utilized to detect a depressed operating button 101, for example, cf. FIG. 7e.

The received signal 68 of the sensor device according to the illustration of FIG. 8 changes as a result of an axial displacement. FIG. 8 shows the profile of the amplitude 69 of the signal 68 detected by the magnetic field sensor 72, illustrated as a function of the axial displacement of the brake components 2, 3 (horizontal axis). The amplitude 69 of the detected signal 68 varies as a result of an axial displacement of the magnetic field sensor 72 in relation to the magnetic ring unit 71. An axial displacement of an operating button 101, or depressing the latter, or a lateral displacement of a mouse wheel 106, for example, or of other components can be detected.

The rotation angle can also be detected by the same sensor 72, wherein the direction of the magnetic field 8 is determined in order for the rotation angle to be detected. The intensity determines the axial position. An activation of the momentary contact switch 74 can be concluded from a variation of the signal 68. This is advantageous because a single (multi-dimensional) Hall sensor can be used for determining the angular position and for determining an axial position.

Figure 8A:
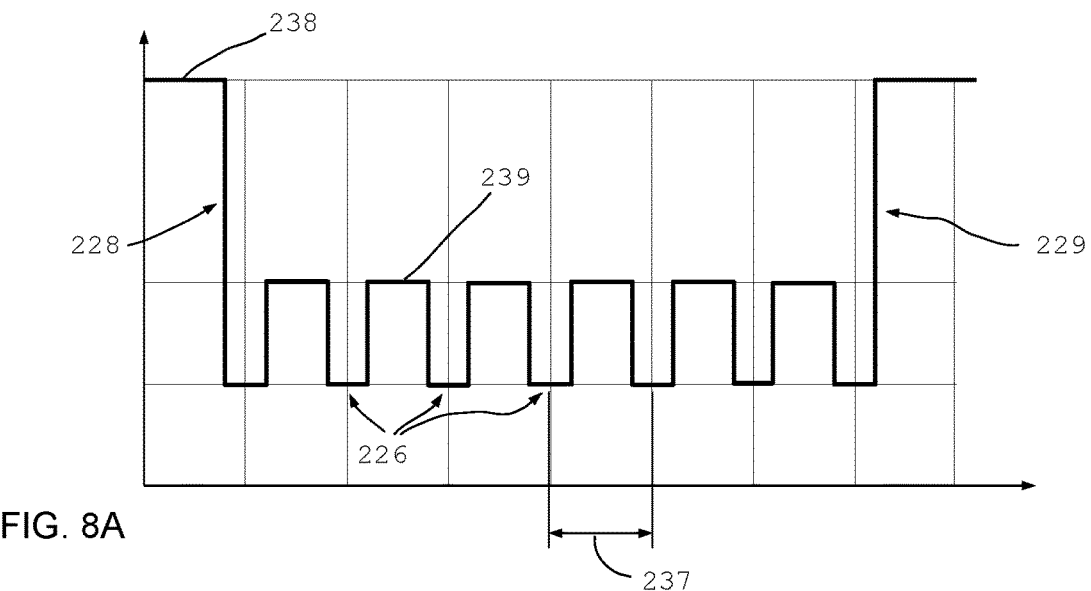
FIGS. 8a-8c show potential torque profiles over the rotation angle of a magnetorheological braking device of a device component according to the invention.
Figure 8B:
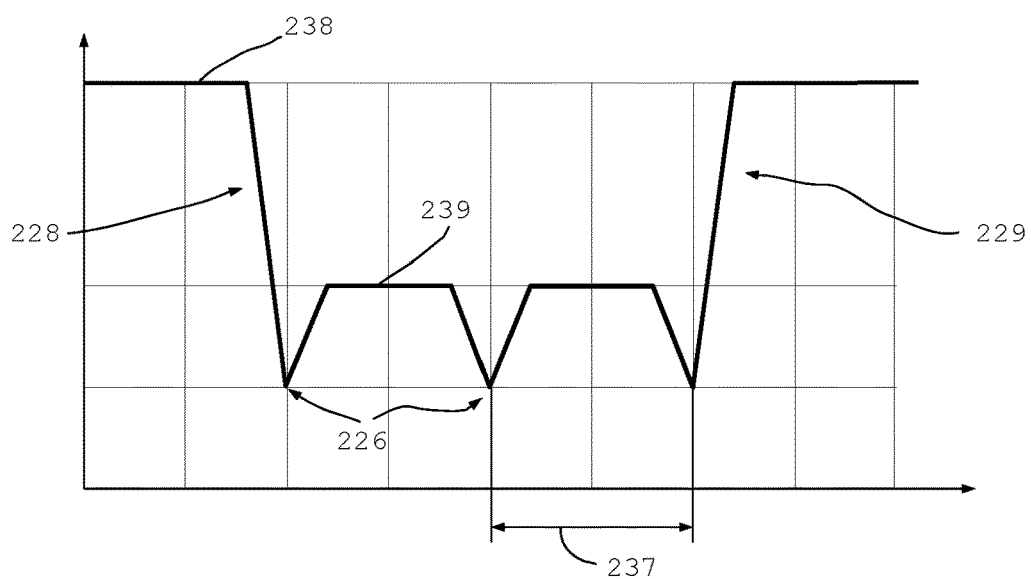
Figure 8C:
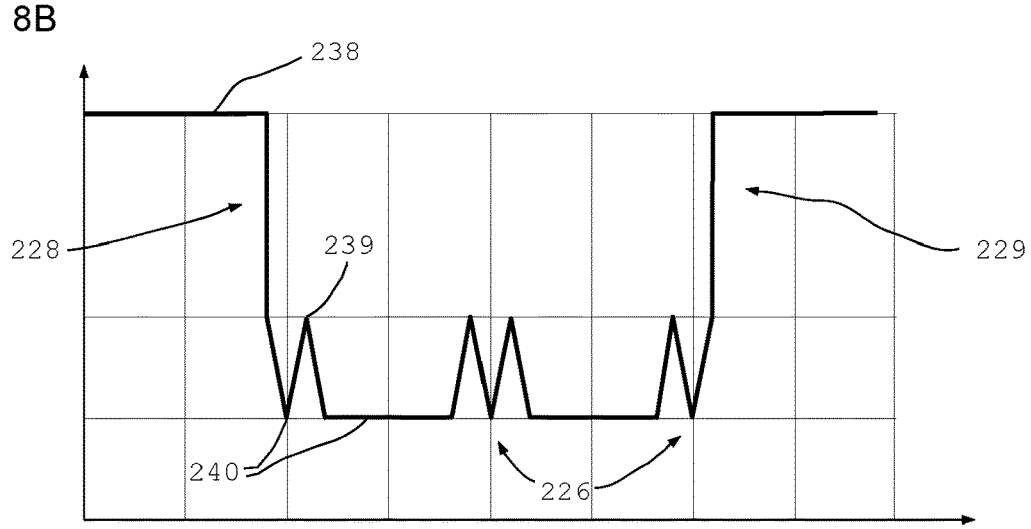

Potential variants of embodiments for controlling a dynamically generated magnetic field, or a dynamically generated braking moment, as a function of the rotation angle are illustrated in FIGS. 8a, 8b and 8c.

FIG. 8a here shows a variant in which a rotary button is used as a haptic operating aid. Illustrated is the rotational resistance over the rotation angle. A left terminal detent 228 and a right terminal detent 229 can be generated by the control device 27. As the rotary button 23 is rotated further, an intense magnetic field, or detent moment 238, is generated thereon, as a result of which the rotary button 23 puts up a high resistance in relation to a rotating movement. The user receives the haptic feedback of a terminal detent.

Rippling of the rotating movement can take place, or be generated, in the process (ripples/ticks). This can be used, for example, for navigating a graphic menu and selecting menu items. A first ripple point 226 which during operation corresponds to a first menu item, for example, is provided here directly beside the left terminal detent 228. If the next menu item is to be selected, the rotary button 100 has to be rotated in the clockwise manner. To this end, the dynamically generated, more intense magnetic field, or the ripple moment 239, or the frictional moment of the latter, has to be overcome before the next ripple point 226 is reached. In FIG. 8a, a respective constant magnetic field for a specific angular range is in each case generated at the ripple points 226 and the intervening regions, said magnetic field at the ripple points being significantly less intense than in the intervening regions, and being again considerably less intense than at the detents 228, 229. A set torque, or else the base moment 240 resulting from the construction, may act on the ripple points 226.

An angular spacing 237 between individual ripple points is dynamically variable and is adapted to the number of available ripple points, or menu items.

FIG. 8b shows a variant in which the magnetic field does not abruptly increase toward the terminal detents 228, 229, but assumes a steep profile. Furthermore, ramp-type gradients of the magnetic field are in each case provided in both directions of rotation at the ripple points 226, as a result of which the rotational resistance increases in the corresponding directions of rotation. Here, only three ripple points 226 are made available by the same operating device 100, the angular spacing 237 of said ripple points 226 being larger than in the example according to FIG. 8a.

FIG. 8c shows a variant in which a lower frictional resistance is present between individual ripple points 226 and a more intense magnetic field 239 is in each case generated only directly adjacent to the ripple points 226, so as to enable latching at the individual ripple points 226 and simultaneously make available only a minor rotational resistance between individual ripple points.

In principle, a mix of the operating modes and the magnetic field profiles of FIGS. 8a, 8b and 8c is also possible. For example, in the case of dissimilar sub-menus, a correspondingly different adjustment of the magnetic field profile can take place (torque over angle).

In all cases it is also possible, for example in the event of a ripple, that switching no longer takes place between a lower and a higher amperage of identical polarity (thus, for example, +0.2 to +0.8 A=ripple) as to date, but takes place in an alternating manner with variable polarity, i.e. from +0.2 to +0.8 A and then for the next ripple by way of −0.2 A to −0.8 A, and then for the next moment peak from +0.2 A to +0.8 A, etc.

In all cases it is also possible for the operating modes of FIGS. 8a, 8b and 8c, or a mix of the operating modes, to be selected by voice commands. The user by way of voice input (using local or remote voice recognition, for example by way of Alexa, Amazon Echo, Siri, Google voice input, etc.) selects a function (volume, station, etc.). The magnetorheological braking device then makes available a corresponding operating mode (volume=ripple with increasing braking moment for increasing volume; radio station selection=ripple with different increments and a minor braking moment therebetween until the station is found).

The preferably low-alloy steel can contain a residual magnetic field. The steel is preferably demagnetized regularly or when required (inter alia by a special alternating field).

The material FeSi3P (silicon steel), or a material of a related generic type, is preferably used for the components passed through by the magnetic field.

In all cases, voice or noise control can be performed. The braking device can be adaptively controlled using the voice control.

When the rotating unit is not being rotated, i.e. when the angle is constant, the current is preferably continuously reduced over time. The current can also be varied as a function of the speed (angular speed of the rotating unit).

FIGS. 9a to 9e show different views of a haptic operating device 100 with a magnetorheological braking device 1, which can be used as an operating button 101. The haptic operating device 100 includes a holder 4, which can be fastened to a console 50, for example, via a nut 51.

Figure 9A:
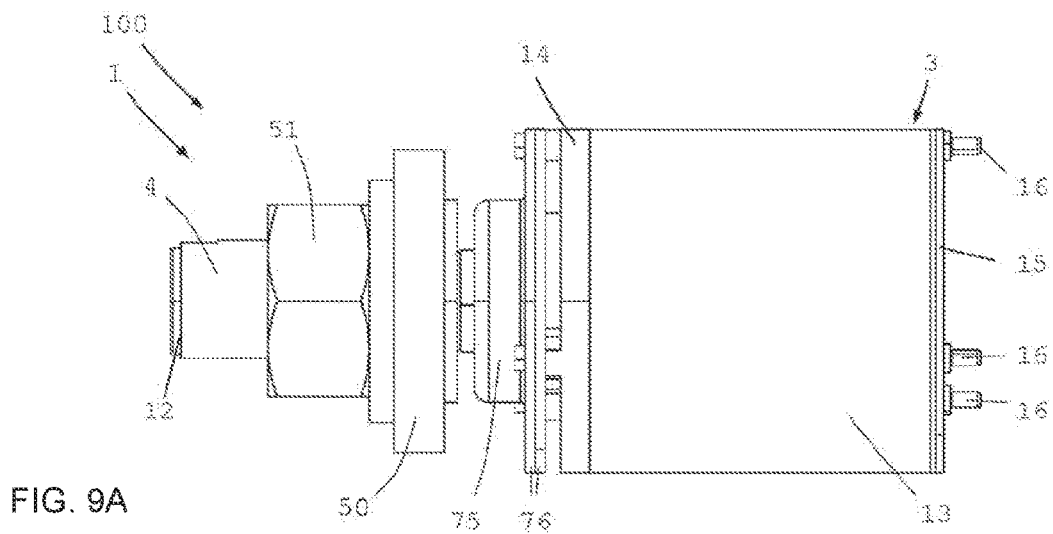
FIGS. 9a-e schematic views yet another device component with a magnetorheological braking device.

The magnetorheological braking device 1 has two braking components 2, 3, of which the inner braking component 2 is not visible in FIG. 9a. The inner brake component 2 is connected to the holder 4. The holder 4 and the inner brake component 2 are designed to be stationary here. The other brake component 3 includes the casing part 13 and is rotatably accommodated on the first brake component 2.

The haptic operating device 100 has a compact design and has a sensor device 70 (not visible here) inside the shielding device 75, which has a two-part shielding body 76 as a shielding housing, for a detection of the rotational position and the axial position of the shell parts 13. The casing part 13 is connected to a left-hand cover 14 and a right-hand cover 15 via pins 16 in order to seal off an inner closed chamber 110.

Figure 9B:
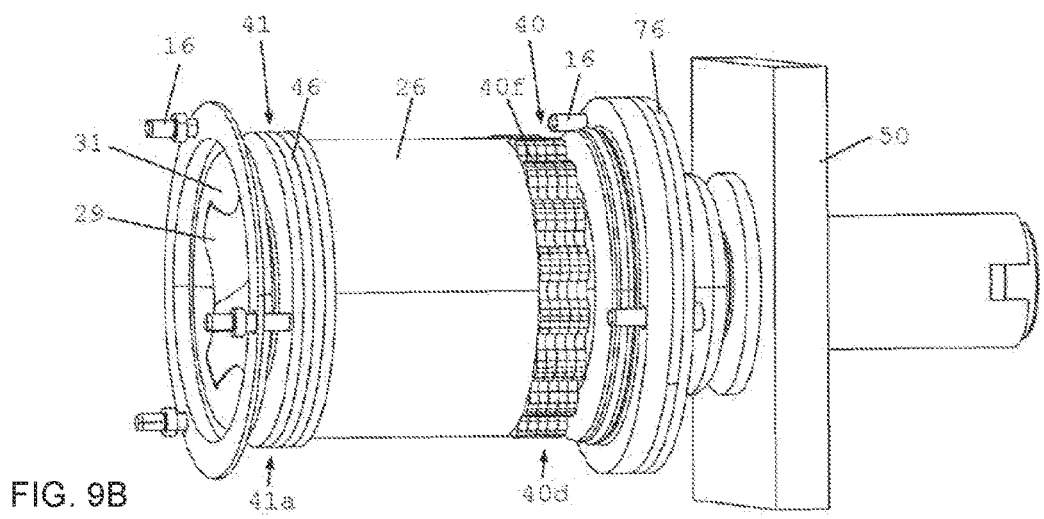

FIG. 9b shows a possible variant with the casing part 13 removed. The coil 26 here covers the core 21 lying underneath. A disk contour 41 is accommodated on the core 21 at the distal—here left—end. A star contour is received at the proximal—here right—end.

At the star contour, or through the star contour 40, there is formed a gap section 40d (as a braking area) between the star contour 40 and the casing part 13, in which there is a variable gap height 40c all around.

At the disk contour 41 at the distal end, or by the disk contour 40, there is defined, or formed, a gap section 41a (as a braking area) between the disk contour 41 and the casing part 13, in which there exists a constant gap height 41b all around.

The gap section 40d and the gap section 41a form the braking areas of the magnetorheological braking device. The magnetic field of the electric coil 26 runs axially on the inside through the core 21 and on the outside axially through the casing part 13 and at the braking areas radially from the star contour 40 into the casing part or from the disk contour into the casing part.

Due to the mixed "hybrid solution," it is possible to achieve braking torque advantages when starting and also at high speeds.

Figure 9C:
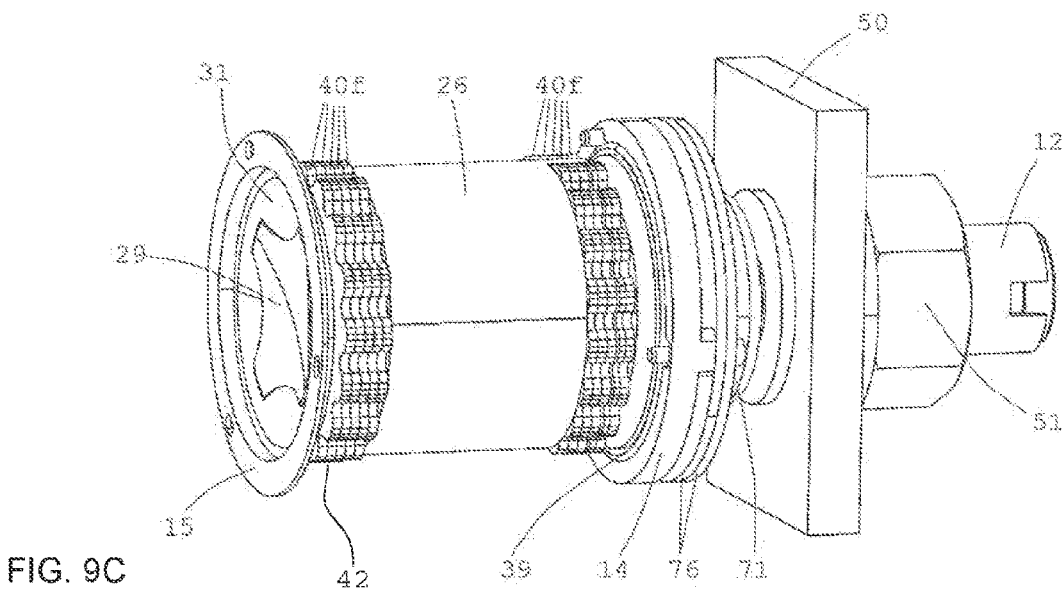

The casing part, not shown here in FIGS. 9b and 9c, is connected to the covers 14, 15 by means of pins or similar fastening means or the like. O-rings 39 or the like can be provided as seals.

In the representation according to FIG. 9c, two star contours are disposed axially at the ends of the core. That allows high maximum torques.

Both in FIG. 9b and in FIG. 9c, the star contours and also the disk contour are each designed as a stacked package 44. A stacked package 44 for a star contour comprises a plurality of star sheets 40f lined up next to one another in order to adjust the thickness. The individual star sheets are in particular stamped parts that can be produced inexpensively.

A stacked package 44 for a disk contour 41 comprises a plurality of disk sheets 46, which are preferably also designed as stamped parts and are lined up next to one another in order to adjust the thickness. Stacks 44 may also include mixed sheets, e.g. (in groups or individually) alternating star plates and sheet plates 46. Such a mixed stacked package 44 also forms a star contour overall.

The haptic operating device 100 includes a sensor device 70 (not visible here), which is shielded by the shielding device 75 with the shielding body 76 designed as a housing. Inside the shielding device 75 there is a magnetic ring unit 71 whose signal is detected by the sensor device 70.

A membrane 31 and a click element 29 can be seen on the side at the distal end. The click element 29 can, for instance, be designed as a snap disk and serve for axial actuation. When actuated, the snap disk produces a noise. The actuation is tactile.

Figure 9D:
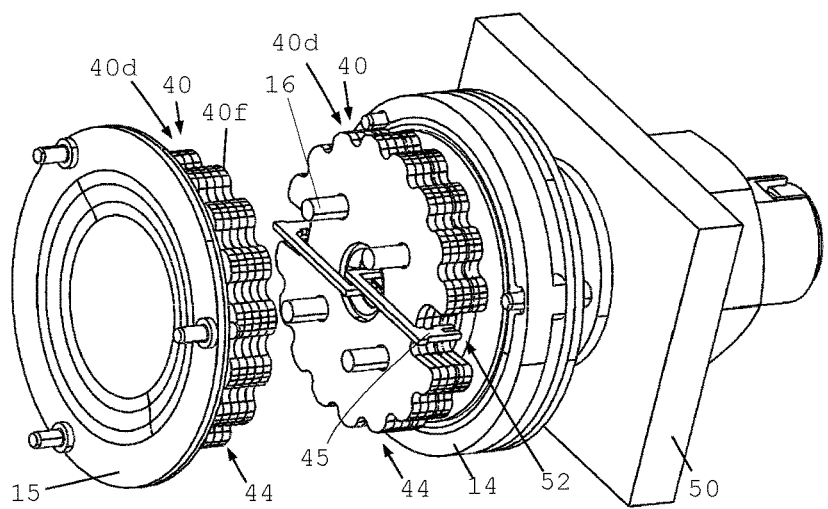

FIG. 9d shows the haptic operating device 100 from FIG. 9c, with the core having been removed. The core is axially connected to the star contours (or alternatively) to disk contours or mixed stack packages and pins 16 or the like pressed axially. It is also possible that the star contours and disk contours are placed onto the core.

This type of star contours 40 enables a simple contacting of the electrical coil. Since the star contour 40 does not rotate, the cable 45 for contacting can be fed radially in the outer region at the radial height of the electrical coil 26 at a radial recess 52 or a through hole. This allows convenient contacting of the electrical coil 26.

Figure 9E:
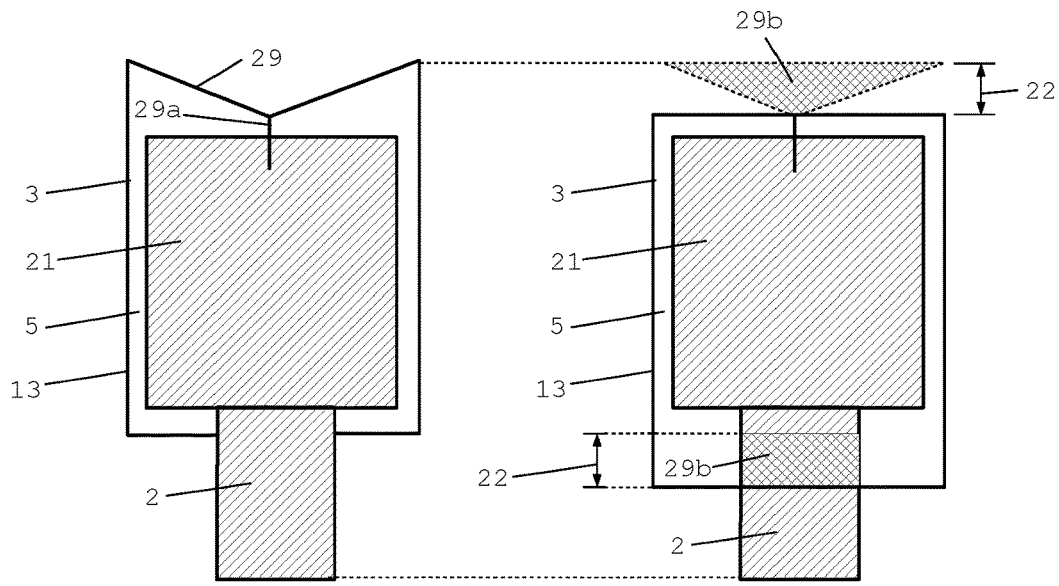

FIG. 9e shows the haptic operating device with a snap-action disk 29 in two different positions in a highly schematic manner, the non-actuated position being illustrated on the left and the actuated position on the right. In the illustration on the left, the snap-action disk is curved outwards and downwards here and is guided here by the guide 29a in the core 21 (but not supported, so there is almost no friction).

The volume of the developed triangle 29b can be seen in the right half of FIG. 9e. The volume 29b results approximately from the hatched three-dimensional cone. If the haptic operating button 100 is actuated and the snap-action disk 29 is deflected from the rest position and transferred to a linear position within one plane, the casing part 13 is displaced here axially downwards with respect to the first brake component 2. As a result, an axial section 22 of the axle, or of the first brake component 2, dives into the interior within the casing part 13. The change in volume 29b of the snap-action disk 29 is preferably dimensioned in such a way that it essentially corresponds to the immersed volume of the first brake component 2. The immersed volume is calculated from the axial path 22 multiplied by the cross-sectional area of the first brake component 2 on the axle 12. By bringing surface 29b as close as possible thereto, pressure buildup within chamber 110 can be minimized or prevented. Volume compensation can also be provided by a membrane 31, as can be seen in FIGS. 9b and 9c.

Figure 10:
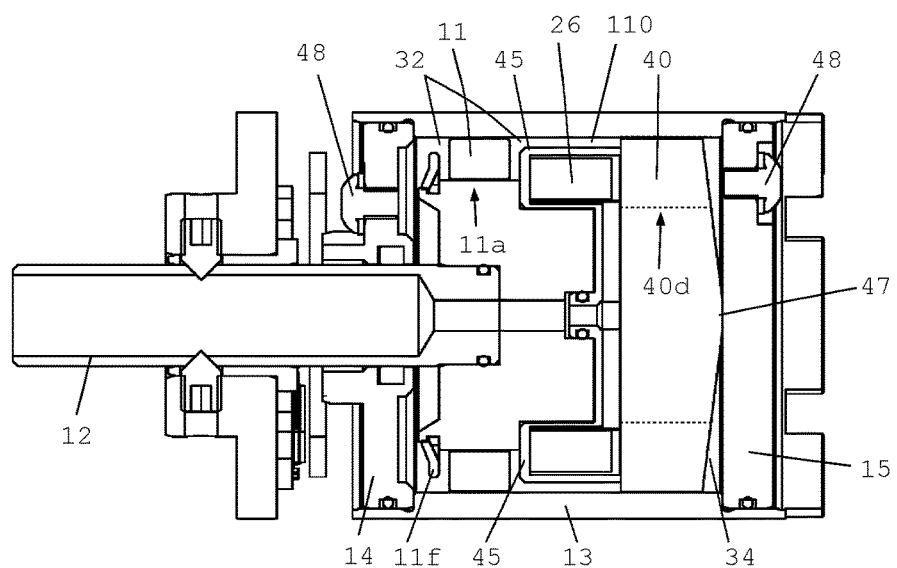
FIG. 10 is a cross-section of another device component with a magnetorheological braking device.

FIG. 10 shows a schematic cross section of another haptic operating device 100, where the first braking component 2 is fixed to a holder 4, for example with grub screws. Two braking areas are also provided in this configuration, with a star contour 40 being formed on the gap section 40d. Rolling bodies 11 or rotating bodies are accommodated on the circumference of the core 21 at the braking gap section 11a and can completely revolve around the core 21. The rolling elements 11 are guided over brackets 11f.

The star contour 40 has an outwardly protruding outer contour 47 at the axially outer end, which is designed here, for example, as a cone, but can also be designed as a pin. As a result, a reservoir 34 for magnetorheological particles remains in each of the corner areas in order to ensure that the braking areas are adequately supplied with magnetorheological particles. In particular, carbonyl iron particles are attracted from the vicinity and concentrated in the magnetic field transition region.

Screws 48 are used to fill or empty the chamber 110.

Figure 11A:
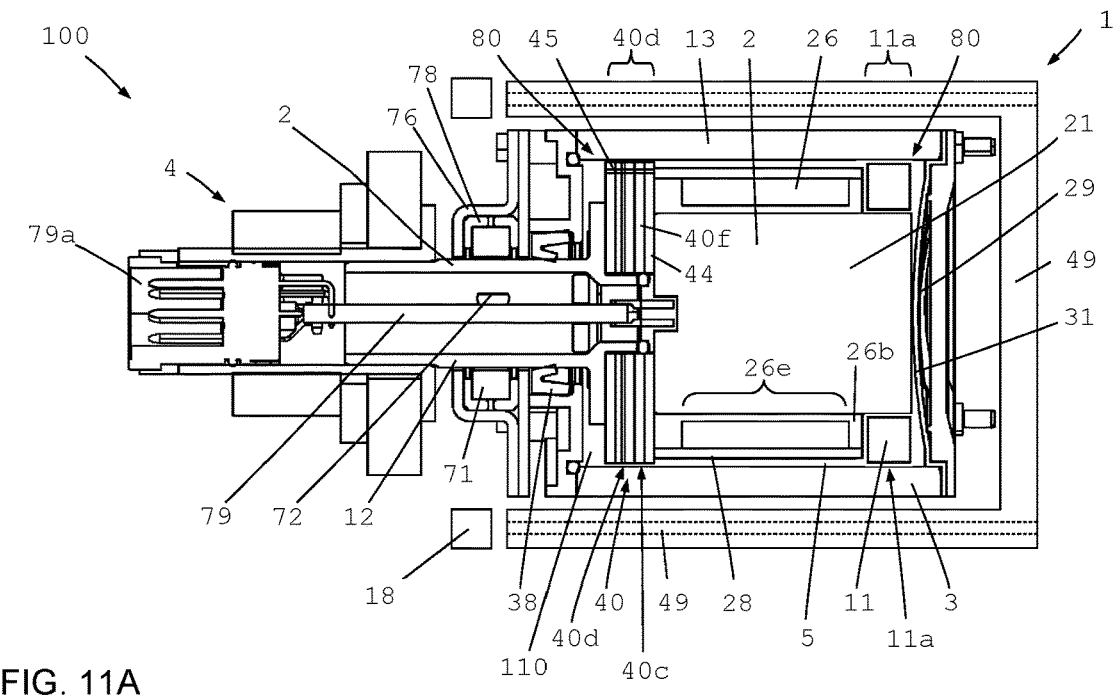
FIGS. 11a-c schematic views nor of a device component having a magnetorheological braking device.
Figure 11B:
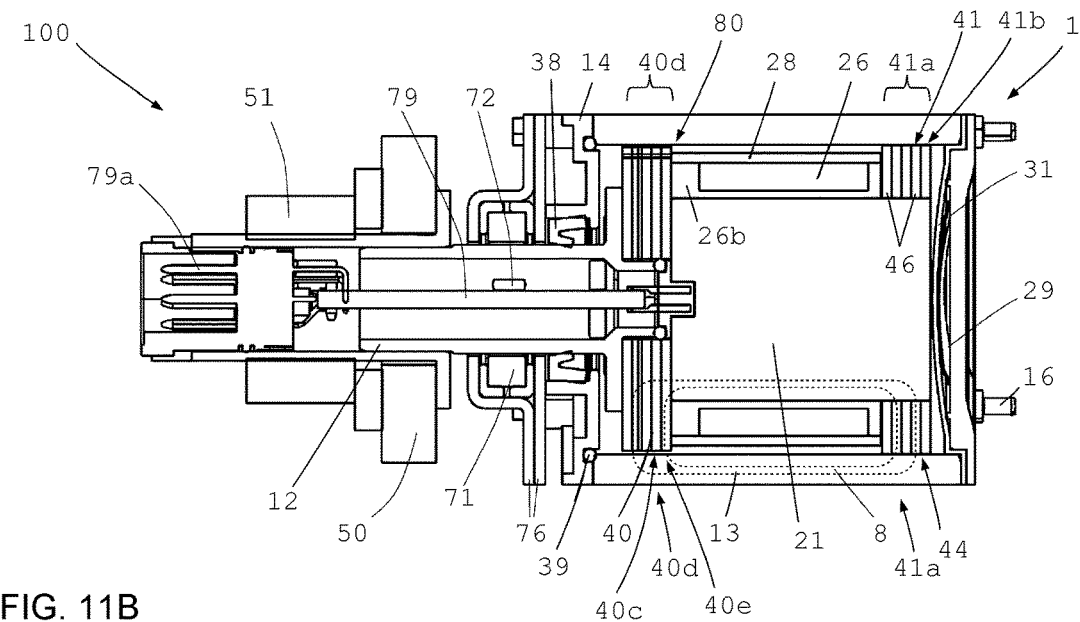
Figure 11C:
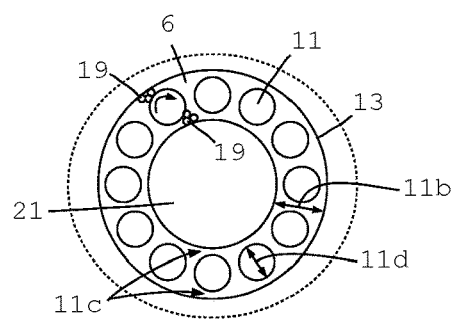

Possible cross sections of a haptic operating device 100 are shown in FIGS. 11a to 11c. The haptic operating device 100 has a magnetorheological braking device 1. The braking component 2 is accommodated on the holder 4, which extends in the axial direction and to which the core 21 is fastened. The braking component 2 comprises a shaft or axle 12 to which the core 21 is attached. The core 21 consists of a magnetically conductive material and the axle here consists of a magnetically non-conductive material so that the magnetic field sensor 72 inside the axle 12 can detect the magnetic field and its orientation inside the axle 12.

The core 21 is surrounded radially by the casing part 13 as the outer or second brake component 3.

The magnetically conductive core 21 is surrounded by an electrical coil 26 which is wound around the core 21. The electrical coil extends over an axial width 26e. At the end of the core 21 facing the holder 4, a star contour 40 is formed, which is applied here to the core 21 and, for example, is pressed or axially attached to it. For this purpose, the star contour 40 has a stacked package 44 of hollow-cylindrical design. The receptacle on the core can also be non-round. The stack package 44 can also be connected axially to the core 21.

The stack 44 consists of a plurality of thin star-shaped laminations 40f. Here, the star sheets 40f are each formed as a stamped part and can be stamped out, for example, from a magnetically conductive sheet metal with a thickness of 1 mm or 2 mm or also 3 mm or 4 mm (or something more or less or something in between). In this way, the required number of star sheets can be punched out easily and inexpensively in order to produce the desired thickness of the star contour 40.

The individual star laminations 40f are pressed together and applied to the core 21 or screwed or pressed with it, for example. A gap section 40d remains in the area of the star contour 40 with a variable gap height 40c between the outer diameter of the star contour 40 and the inner circumference of the casing part 13. The axial width 40d of the star contour 40 is determined here by the number of star laminations 40f and can be larger or larger smaller than shown.

Here, the star contour 40 is axially directly adjacent to the electric coil 26, which is accommodated in a coil holder 26b and is completely sealed radially outwards by a casting compound 28.

The star contour 40 is connected to the core 21 and to the fixed brake component 2 and does not rotate during operation. This allows a hole or recess 52 to be formed for the passage of the cables 45 for electrical connection of the electrical coil 26. The electrical coil 26 can thereby simply be connected inexpensively and quickly.

The star contour 40 is formed here at the proximal end, that is to say at the end of the core 21 which faces the holder 4. At the distal end, that is, at the other end of the core 21, a rolling body portion 11*a* is formed. The rolling body portion 11*a* extends over the axial width of the rolling bodies 11. The rolling bodies 11 are distributed there on the circumference of the core 21. The rolling bodies 11 form magnetic field concentrators 80 for the local amplification of the magnetic field as it passes through the rolling body section 11*a*.

A very high braking torque can be achieved by the rolling element section 11*a*, in particular at low speeds of rotation of the casing part 13. A strong magnetic field can be transmitted from the core 21 to the casing part 13 through the gap section 40*d* in the area of the star contour 40, since the minimum gap height is considerably smaller than the radial free space 11*c* in the area of the rolling element section 11*a*. As a result, a high torque can be generated, which is also made possible, in particular, at higher speeds. As a result, a high torque can be made available over the entire speed range.

The axial width of the rolling element section 11*a* and the width of the gap section 40*d* of the star contour 40 are approximately the same here (±25%) and together are somewhat shorter than the electrical coil 26. A very compact structure is achieved overall.

The casing part 13 is surrounded by a coating 49 forming a rotary knob 23, in FIG. 11*a*. The knob 23 is at least partially transparent so that it can be illuminated by the lighting means 18 in the form of LEDs, for example. The lighting can be controlled depending on the situation or independently of the situation.

At the front end, the closed chamber 110 inside the shell part 13 is closed by a front cover 14, through which the brake component 2 is carried out. A seal 38 is used for sealing. At the rear or distal end, the chamber 110 is first delimited by an elastic membrane 31, which is adjoined on the outside by a click element 29 designed here as a snap-action disk.

By axial actuation of the knob 23, the snap disk, i.e., the click element is actuated and the casing part 13 is moved slightly to the left overall. This axial movement can be controlled by the sensor device 70 with the magnetic field sensor 72 inside the holder or of the first brake component 2, which is surrounded radially by a magnetic ring unit 71. The magnetic field sensor 72 is designed in particular as a Hall sensor 72 and detects the alignment of the radial magnetic field relative to the magnetic field sensor 72. In this way, an angular position of the casing part 13 relative to the core 21 can be detected. An axial displacement of the casing part 13 by actuating the click element 29 leads to a relative axial offset between the magnetic ring unit 71 and the magnetic field sensor 72, which causes a change in the intensity of the detected signal. In this way, an actuation of the click element can be detected.

FIG. 11*b* shows a slightly different representation of a haptic operating device with a magnetorheological braking device, in which case, in contrast with FIG. 11*a*, the rotary knob 23 has been omitted.

An essential difference between FIGS. 11*a* and 11*b* is that a gap section 41*a* with a disk contour 41 is provided at the distal end of the casing part 13 in FIG. 11*b*. A star contour 40 is also formed on the proximal end of the casing part 13. The disk contour enables higher braking torques when stationary and at high speeds.

In this embodiment, for example, there may be provided, outside of the chamber 110 between the seal 38 and the sensor device 70, a bearing for mounting the casing part 13 relative to the brake component 2. It is also possible, however, for the bearing to be effected at one end only via the seal 38 and the star contour 40 and at the other distal end only via the disk contour 41.

Some magnetic field lines 8 are drawn in by way of example in FIG. 11*b* which illustrate the primarily axial course of the magnetic field lines in the core 21 and in the jacket part 13. Furthermore, it can also be seen that in the braking areas at the gap section 40*d* and the gap section 41*a* the magnetic field lines 8 pass (approximately) radially in each case.

The magnetic field sensor 72 is mounted on a sensor circuit board 79 and can be contacted via the contact pins 79*a*. The electrical coil 26 is also supplied with current via this.

At least in the area of sensor device 70 and magnetic field sensor 72, inner brake component 2 is preferably made of a material that is not magnetically conductive or has little or no magnetic conductivity, in order to enable detection of the orientation and the intensity of the magnetic field of magnetic ring unit 71 in the interior of axle 12 or the to ensure first brake component 2. The sensor device 70 is accommodated there in a particularly protected manner (protection from water and dust).

An O-ring 39 can be seen in FIG. 11*b* which seals off the lid 14 relative to the jacket part 13.

FIG. 11*c* basically shows a schematic cross section of the rolling element section 11*a*. Inside, the core 21 can be seen around which the rolling bodies 11 are arranged. The rolling bodies are in turn surrounded by the casing part 13. The rolling elements each have a diameter 11*d*. A radial gap height 11*b* is slightly larger than the diameter 11*d*. A radial free space 11*c* results as the difference between the gap height 11*b* and the diameter 11*d*. As a rule, the radial free space 11*c* is evenly divided radially on the inside and radially on the outside.

A magnetorheological medium which comprises magnetorheological particles 19 is accommodated in the chamber 110. A gap 5 is formed in the chamber 110 between the brake components 2 and 3. The chamber 110 is at least partially filled with a magnetorheological medium 6 here. The medium here is preferably a magnetorheological fluid which, for example, comprises an oil as the carrier liquid, in which ferromagnetic particles 19 are present. Glycol, grease, water and viscous materials can also be used as a carrier medium, but are not limited to them. The carrier medium can also be gaseous or the carrier medium can be dispensed with (vacuum). In this case, only particles 19 that can be influenced by the magnetic field are filled into the chamber 110.

The ferromagnetic particles 19 are preferably carbonyl iron powder, with the size distribution of the particles depending on the specific application. A particle size distribution of between one and ten micrometers is specifically preferred, although larger particles of twenty, thirty, forty and fifty micrometers are also possible. Depending on the application, the particle size can also become significantly larger and even reach the millimeter range (particle balls). The particles can also have a special coating/shell (titanium coating, ceramic, carbon shell, etc.) so that they can better withstand the high pressure loads that occur depending on the application. For this application, the magnetorheological particles can be made not only of carbonyl iron powder (pure iron), but for example can also be made of special iron (harder steel).

It is possible that only particles that can be influenced by the magnetic field are filled into the gap 5 or the chamber 110, with air or an inert gas being added if necessary. if e.g. only air or another gas is used, different solids can be mixed to improve certain properties. For example, added graphite powder can be used to reduce the friction between the carbonyl iron particles because graphite has a lubricating effect. In particular, the particles can be coated with PTFE. In particular, a coating with PTFE or a comparable coating prevents the particles from clumping together and forming larger lumps. Such larger clumps do not disintegrate easily or may not disintegrate at all. Alternatively, the disk bodies or roller bodies can be coated with PTFE to reduce friction. When using MRF without oil or other liquid as a carrier medium, it must be ensured that no water condenses in the brake chamber (MR space or MRF space). For example, silicic acid gel (known as silica gel) or another desiccant that absorbs water and thus removes moisture from its surroundings can be mixed in The magnetorheological particles 19 chain together when a magnetic field is applied, as shown very schematically in FIG. 11*c*. This creates a wedge effect, which leads to a significant increase in the braking torque at low and medium speeds.

For a more detailed explanation of this effect, reference is made to FIG. 4 of the applicant's international application WO 2018/215350 A1, which, with regard to the explanation of the effect, is fully integrated in the disclosure of this application by reference.

Figure 12:
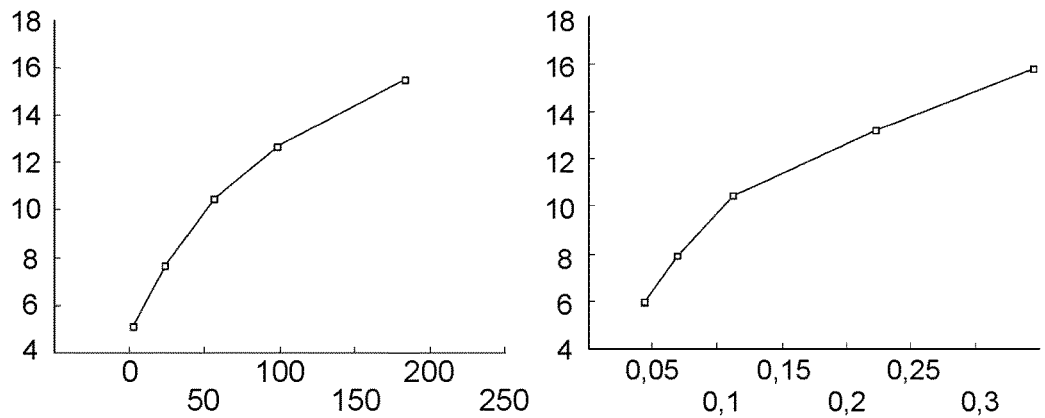
FIG. 12 Torque curves of an electric motor and a magnetorheological braking device over the electrically applied power FIG. 13 the resulting braking torque curves of a magnetorheological braking device for two different currents over time.

FIG. 12 shows a schematic representation of two braking torque curves generated, the braking torque generated (normalized and therefore dimensionless here—Y axis) being plotted against the electrically introduced power (normalized and therefore dimensionless here—X axis). The curve for a BLDC motor ("brushless direct current motor") is shown on the left and the curve for a magnetorheological braking device is shown on the right. It can be seen that the electric motor requires significantly more power than the magnetorheological braking device for the same braking torque. The electric motor requires more than "130" normalized power for a braking torque of "14" while the magnetorheological braking device (clearly) requires a power of less than "0.3". The power consumption ratio is greater than 100:1 and is about 500:1 here.

Magnetorheological clutch devices and brakes have the advantage, among other things, that they require little power to engage or dampen movements, are quiet, generate little heat and react very quickly (~ms), etc. The low power requirement is particularly advantageous for battery-operated components such as, for example, electric vehicles, in which the power consumption of all components is automatically reflected in the range of the vehicles. However, power consumption is also an issue in vehicles with combustion engines or electrical devices in general.

Figure 13:
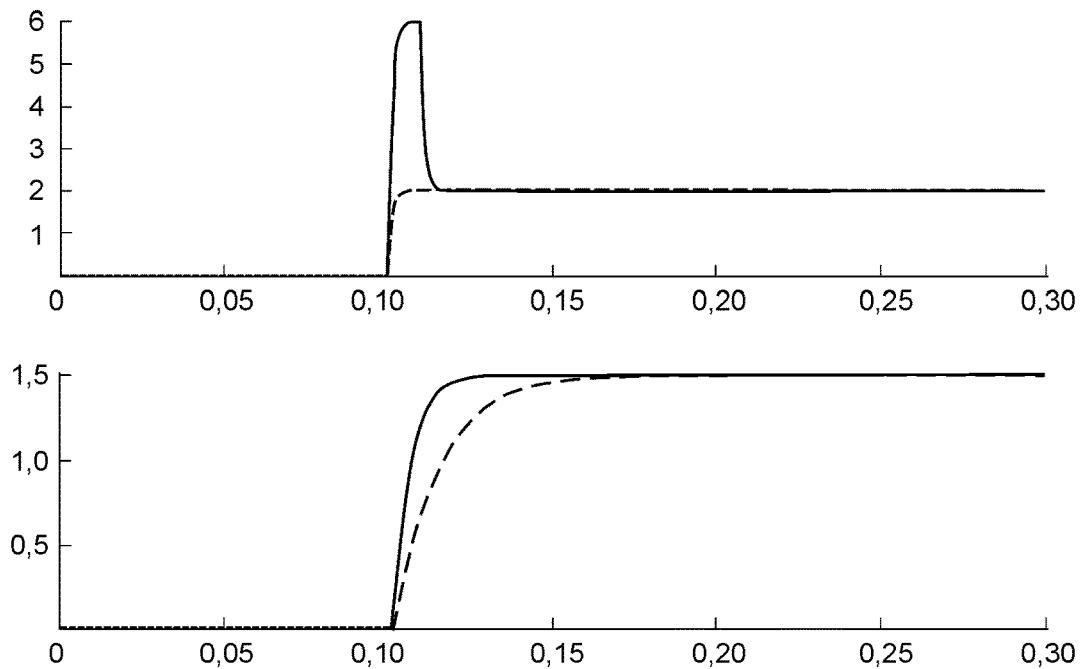

FIG. 13 shows the resulting braking torque curves of a magnetorheological braking device 1 for two different current intensity curves (Y axis) over time (X axis). The dashed curve in the upper half of the figure represents the conventional course, in which the current intensity is increased directly to the desired current intensity.

Here, for example, at the point in time 0.1 seconds, the current is increased from 0 amperes to 2 amperes. The resulting course of the braking torque or the coupling intensity is shown in broken lines in the lower half of FIG. 13. The transmittable braking torque increases in the dashed curve from the starting time at 0.1 seconds within about 25 milliseconds (time 0.125 seconds) to a read value of about 1.25 (normalized to e.g. an average value or a standard unit) and reaches after about 75 milliseconds (point in time 0.175 seconds) asymptotically (almost) the set limit value of about 1.5.

If, on the other hand, at the beginning of the clutch or the start of the braking or damping process, the current intensity is increased threefold to, say, here 6 Ampere, as shown by the solid lines, the braking torque increases significantly more and reaches the final value of 1.5 after about 10 milliseconds. The "current boost" with increased current is only activated for about 10 ms here. After that, as shown by the upper solid curve, the current is reduced to 2 amperes. A significantly faster setting can be achieved (i.e., made available) by briefly increasing the current ("current boost") of the clutch, damping or braking torque. This is very advantageous in several respects, as it allows you to stop quickly and experience a more direct haptic feeling (feedback). In reality, the difference between the two curves is very noticeable.

Figure 14:
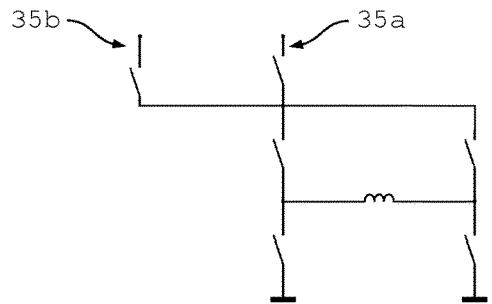
FIG. 14 a strongly schematic circuit for controlling the electric coil.

FIG. 14 shows a schematic of a circuit for rapid activation of the electrical coil 26. The electrical coil 26 (magnetic coil) can be used here, for example, driven by an H circuit. This is only indicated here by switches. A voltage source 35*a* used in normal operation or in continuous operation with a lower voltage of for example 12V (or 3V or 6V; depending on the application, a suitable voltage) provides the voltage for normal operation. For the voltage peaks, a voltage source 35*b* with a higher voltage of e.g. 18V or 24V (or e.g. 6V or 12V) is connected via a switch. Then, the lower voltage power source 35*a* is temporarily disconnected. After the maximum current has been reached, the higher voltage source 35*b* is once more disconnected from the circuit and the electrical coil 26 and the lower voltage source 35*a* is reconnected. The switches can be any electrical components that are particularly capable of coupling and decoupling in the millisecond range.

As a result, the current in the electrical coil 26 reaches the desired value more quickly. In a specific case, the desired current is reached within 10 ms instead of 40 ms. The switch-over between the voltages can be done via an electrical circuit.

A combination of voltage and current is also possible. Voltages of more than 24 volts and far above (e.g., >hundred volts) are also possible.

LIST OF REFERENCE SIGNS

1 Magnetorheological braking device
1*a* Brake housing
2 Brake component
3 Brake component
4 Mount
5 Gap, duct
6 Medium
8 Field
10 Acute region
11 Rolling body
11*a* Rolling body
11*b* Gap height of 5*b*
11*c* Radial free space
11*d* Diameter of 11
18 Lighting means
19 Magnetic particles
20 Axial direction
21 Core
21*b* Minimum diameter
22 Stroke
23 Rotary button
24 External ring
25 Radial direction diameter
26*a* Maximum
26*b* Coil mount
26*c* Coil plane
26*d* Radial direction to 5*b* 26*c*
26*e* Axial width 11 f Holder 27 Control device
12 Axle 28 Casting compound
13 Casing part 29 Snapping disc
13a Diameter 29a Guide
13b Diameter 29b Volume
13c Height 30 Bearing
13d Wall thickness 31 Membrane
13e Sleeve part 32 Transverse groove
14 End piece 33 (Cylindrical) main body
16 Pin 35 Cable conduit
36 Receptacle 67 Internal surface of 13
37 Cylindrical running 68 Signal face
37a External diameter 69 Amplitude
38 Seal 70 Sensor device chamber
39 O-ring 71 Magnetic ring unit
40 Star contour 72 Magnetic field sensor
40a Annular flange 73 Sensor line point
40b Nut 74 Momentary contact switch
40c Gap height 75 Shielding device
40d Gap section 76 Shielding member
40e Minimal gap height 77 Separation unit
40f Star sheet 78 Decoupling device
41 Disk contour 79 Sensor board
41a Gap section 79a Contact pin
41b Gap height 80 Magnetic field concentrator
42 Disk body 81 Magnetic concentrator
43 User interface 82 Distal end
44 Stack packet 83 Arm
45 Cable 84 Radial length of the arm
46 Disk sheet 85 Gap height
47 Projecting outer 86 External surface contour
48 Filling screw 87 Gap dimension
49 Covering 87a Depression
50 Console 100 Haptic operating device
51 Nut 101 Operating button
61 Angular segment 118 Second bearing point
62 Angular segment 119 Stub axle
102 Thumb wheel 120 Compensation duct
103 Computer mouse 121 End portion of 2
104 Joystick 122 Radial direction (global)
105 Gamepad 200 Device component
106 Mouse wheel 226 Ripple point
110 Closed chamber 228 Terminal detent
111 First end of 110 229 Terminal detent
112 First bearing point 237 Angular spacing
113 Magnetic field 238 Detent moment generator
114 Volume of 110 239 Ripple moment
115 Second end of the 240 Base moment closed
116 Diameter of first bearing point
117 Diameter of second bearing

The invention claimed is:

1. A magnetorheological braking device, comprising:
a brake housing, a stationary mount, and at least two brake components including a first brake component and a second brake component;
one of said brake components being connected to said mount in a rotationally fixed relationship, and said at least two brake components being continuously rotatable relative to one another;
said first brake component extending in an axial direction and having a core of a magnetically conductive material that extends in the axial direction;
said second brake component including a hollow casing part which extends about said first brake component, forming an encircling gap;
a magnetorheological medium at least partially filling said encircling gap;
an electric coil disposed in said brake housing;
a star contour disposed between said casing part and said core, said star contour having magnetic field concentrators that protrude into said gap to form therein an encircling gap section having a variable gap height in a region of said star contour, and said star contour including at least one stack of star sheets.

2. The magnetorheological braking device according to claim 1, which comprises at least one disk contour formed between said casing part and said core, wherein a gap section is formed between said disk contour and said casing part, and wherein a gap height in said gap section of said disk contour is less variable than a gap height in said gap section of said star contour.

3. The magnetorheological braking device according to claim 2, wherein said gap section of said disk contour has a gap height which is substantially constant over a circumference.

4. The magnetorheological braking device according to claim 2, wherein said disk contour has a cylindrical outer contour.

5. The magnetorheological braking device according to claim 2, wherein said disk contour has an outwardly projecting outer contour on at least one axial side.

6. The magnetorheological braking device according to claim 2, wherein the gap section of said disk contour has a smaller gap height than a minimum gap height of said gap section of said star contour.

7. The magnetorheological braking device according to claim 2, wherein at least one of said star contour or said disk contour is configured to rotatably guide said casing part and to serve as a bearing point.

8. The magnetorheological braking device according to claim 1, wherein said core is formed with a rolling element section and rolling bodies are disposed between said rolling element section of said core and said shell part.

9. The magnetorheological braking device according to claim 8, wherein said rolling bodies consist of a magnetically conductive material.

10. The magnetorheological braking device according to claim 8, wherein a radial free space for accommodating a rolling element between said casing part and said rolling element section of said core is greater than a minimum gap height in said gap section of said star contour.

11. The magnetorheological braking device according to claim 10, wherein the radial free space for a rolling element in said rolling element section is more than twice as large as the minimum gap height in said gap section of said star contour.

12. The magnetorheological braking device according to claim 1, wherein said second braking component is axially displaceable on said first braking component.

13. The magnetorheological braking device according to claim 12, which comprises a clicking element at a distal end of a chamber accommodated in said brake housing.

14. The magnetorheological braking device according to claim 13, which comprises an elastic membrane separating the chamber from said clicking element.

15. The magnetorheological braking device according to claim 13, wherein said clicking element is a snap disk and wherein a change in a spanned volume of said snap disk is adapted to a cross-sectional area of the axle multiplied by an axial offset of the snap disk upon actuation.

16. The magnetorheological braking device according to claim 1, wherein said star contour is one of at least two star contours accommodated in said brake housing at an axial distance from one another.

17. The magnetorheological braking device according to claim 16, wherein at least two of said star contours have a different outer contour.

18. The magnetorheological braking device according to claim 16, wherein at least one of said star contours is a separate annular flange formed with radially projecting magnetic field concentrators.

19. The magnetorheological braking device according to claim 1, wherein said electric coil is at least one electric coil wound around an axle and configured to generate a magnetic field in the axial direction or said electric coil is at least one electric coil wound axially around said core and configured to generate a magnetic field in a radial direction.

20. The magnetorheological braking device according to claim 19, wherein said electrical coil is received radially between said core and said casing part and said electrical coil is fixed internally to said casing part or wound onto said core.

21. The magnetorheological braking device according to claim 1, wherein said at least one stack comprises a plurality of star sheets lying directly against one another.

22. The magnetorheological braking device according to claim 1, wherein said at least one stack comprises star sheets and disk sheets.

23. The magnetorheological braking device according to claim 1, wherein said stack comprises a plurality of stamped parts or consists of stamped parts.

24. The magnetorheological braking device according to claim 1, wherein at least one of said magnetic field concentrators has a cross-sectional area that tapers towards a distal end or is rounded at the distal end.

25. The magnetorheological braking device according to claim 1, wherein said magnetic field concentrators project radially into said gap and are formed by at least one of a plurality of arms of said core or a plurality of arms projecting from said casing part.

26. The magnetorheological braking device according to claim 1, wherein said star contour is formed with magnetic field concentrators that project radially outwards and are magnetically conductively attached to said core or wherein said star contour is formed with magnetic field concentrators that project radially inwards and are magnetically conductively attached to said casing part.

27. The magnetorheological braking device according to claim 1, wherein said magnetic field concentrators extend over at least one angular segment about an outer circumference of said core 69, wherein each angular segment is less than 150°, and no magnetic field concentrator is arranged outside of the angular segment, and wherein said electrical coil is wound in an axial direction around said core outside of the angular segment.

28. The magnetorheological braking device according to claim 1, wherein a maximum diameter of said electrical coil in a radial direction within a coil plane is greater than a minimum diameter of said core in a radial direction transversely to the coil plane.

29. The magnetorheological braking device according to claim 1, further comprising a shielding device for at least partially shielding a sensor device from a magnetic field generated by said electrical coil.

30. The magnetorheological braking device according to claim 1, wherein said braking components are disposed with a closed chamber therebetween, wherein said second braking component at a first end of the closed chamber is rotatably received on said first brake component and the closed chamber is substantially filled with said magnetorheological medium.

31. A device component, comprising a magnetorheological braking device according to claim 1.

\* \* \* \* \*